United States Patent [19]
Uno et al.

[11] Patent Number: 5,652,655
[45] Date of Patent: Jul. 29, 1997

[54] ROAD SURFACE DISCRIMINATOR AND APPARATUS APPLYING SAME

[75] Inventors: Tetsuya Uno; Takeshi Ishida; Junichi Takagi; Yasunobu Sakai, all of Kyoto, Japan

[73] Assignee: Omron Corporation, Kyoto, Japan

[21] Appl. No.: 553,560

[22] PCT Filed: Jun. 29, 1994

[86] PCT No.: PCT/JP94/01053

§ 371 Date: Dec. 19, 1995

§ 102(e) Date: Dec. 19, 1995

[87] PCT Pub. No.: WO95/01549

PCT Pub. Date: Jan. 12, 1995

[30] Foreign Application Priority Data

Jun. 29, 1993 [JP] Japan ........................... 5-186671

[51] Int. Cl.$^6$ .............................. G01B 11/24; G01B 11/30
[52] U.S. Cl. .............................................. 356/371; 356/376
[58] Field of Search ................................ 356/73, 371, 376, 356/446; 73/146; 250/339.1, 341.8

[56] References Cited

U.S. PATENT DOCUMENTS

| | | | |
|---|---|---|---|
| 4,690,553 | 9/1987 | Fakamizu et al. | 356/51 |
| 4,781,465 | 11/1988 | Damachi et al. | 356/371 |
| 5,163,319 | 11/1992 | Spies et al. | 73/146 |
| 5,218,206 | 6/1993 | Schmitt et al. | 250/339 |

FOREIGN PATENT DOCUMENTS

| | | |
|---|---|---|
| 0014139 | 2/1981 | Japan ........................... 356/446 |
| 60-80352 | 6/1985 | Japan . |
| 60-92661 | 6/1985 | Japan . |
| 61-283871 | 12/1986 | Japan . |
| 63-54529 | 4/1988 | Japan . |
| 5-52857 | 3/1993 | Japan . |
| 5-52858 | 3/1993 | Japan . |
| 6-43176 | 2/1994 | Japan . |
| 6-74959 | 3/1994 | Japan . |
| 6-109746 | 4/1994 | Japan . |
| 6-138133 | 5/1994 | Japan . |
| 6-201708 | 7/1994 | Japan . |
| 6-230018 | 8/1994 | Japan . |
| 6-265561 | 9/1994 | Japan . |
| 6-313769 | 11/1994 | Japan . |
| 6-313770 | 11/1994 | Japan . |

(List continued on next page.)

OTHER PUBLICATIONS

Toshio Takehana, "Road–Surface Condition Sensor Utilizing Polarizing Characteristics of Road Surface Reflection", *Hikari–Gijutsu Contact*, vol. 27, No. 3, pp. 158–164 (1989).

Katsuhiro Oba et al., "Road–Surface Estimation Using Fuzzy Logic", *Jidosha Gijutsukai Gakujutsu Koenkai Zensatsushu*, pp. 109–112, (May, 1988).

Yasunobu Sakai et al., "Optical Spatial Filter Sensor For Ground Speed", Frontiers in Information Optics, Topical Meeting of the International Commission for Optics (Apr. 5, 1994), and Abstract.

*Primary Examiner*—Frank G. Font
*Assistant Examiner*—Zandra V. Smith
*Attorney, Agent, or Firm*—Foley & Lardner

[57] ABSTRACT

Light is projected upon a road surface (LD) from a light source (11) for illuminating the road surface. Diffuse reflected light from the road surface (LD) is received by light sensors (31A, 31B) through a spatial filter, and the resulting light-reception signals are applied to a differential amplifier circuit (51). A center-frequency component corresponding to the spatial frequency of the spatial filter is extracted by a tracking band-pass filter (52), and the intensity (Da) thereof is detected by an amplitude detector circuit (54). Low-frequency component intensity (Db) corresponding to a spatial frequency lower than the spatial frequency of the spatial filter is detected by a tracking low-pass filter (55) and an amplitude detector circuit (56). The condition of the road surface is judged to be snow, gravel or asphalt in a discriminating circuit (60) based upon the center-frequency component intensity (Da) and the low-frequency component intensity (Db).

44 Claims, 39 Drawing Sheets

FOREIGN PATENT DOCUMENTS

| | | |
|---|---|---|
| 6-313771 | 11/1994 | Japan . |
| 6-313772 | 11/1994 | Japan . |
| 6-317602 | 11/1994 | Japan . |
| 6-317766 | 11/1994 | Japan . |
| 6-324059 | 11/1994 | Japan . |
| 6-324060 | 11/1994 | Japan . |
| 7-49223 | 2/1995 | Japan . |
| 7-120484 | 5/1995 | Japan . |
| 7-151771 | 6/1995 | Japan . |

EXTRANEOUS LIGHT

Fig.32
OUTPUT OF DIFFERENTIAL AMPLIFIER CIRCUIT
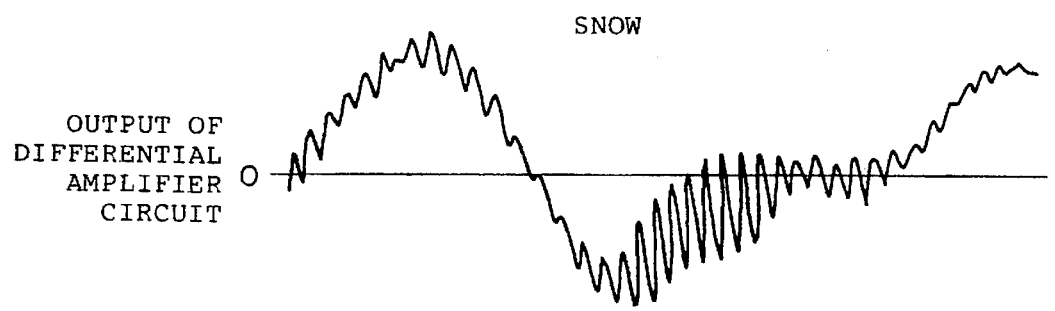
SNOW
OUTPUT OF BINARIZING CIRCUIT 83
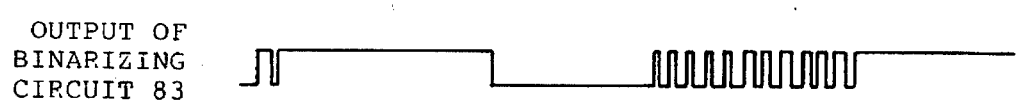
OUTPUT OF TRACKING BPF
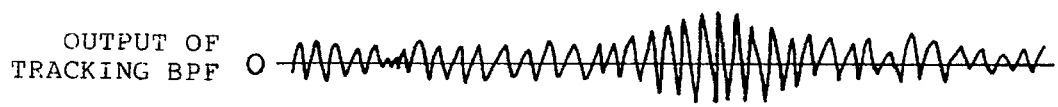
OUTPUT OF BINARIZING CIRCUIT 81

Fig. 41

| ROAD SURFACE CONDITION | OPTIMUM SLIP FACTOR $\lambda_m$ |
|---|---|
| DRY ASPHALT | 0.2 |
| GRAVEL | ..... |
| SNOW | ..... |
| ⋮ | ⋮ |

000# ROAD SURFACE DISCRIMINATOR AND APPARATUS APPLYING SAME

TECHNICAL FIELD

This invention relates to a discriminator used upon being installed in a vehicle to discriminate the condition (snow-covered, gravel-covered, asphalt, wet, frozen, etc.) of the surface of a road on which the vehicle travels, and to an apparatus to which the discriminator is applied.

BACKGROUND ART

An antilock brake system (ABS) (or antiskid system) is a system for shortening vehicle braking distance as much as possible by controlling a brake so as to obtain a slip factor that maximizes braking force. Since a slip factor for maximizing braking force differs depending upon the condition of the road surface, it is necessary that the condition of the road surface be discriminated so as to carry out optimum ABS control suited to the conditions of the road surface. In addition, it is necessary to identify very bumpy gravel roads in order to absorb unpleasant vibration and maintain ideal riding comfort by controlling the suspension in conformity with the roughness of the road surface.

One technique for optically discriminating road surface conditions without contact is disclosed in "Road-Surface Condition Sensor Utilizing Polarizing Characteristic of Road Surface Reflection", by Toshio Takehana, *Hikari Gijutsu Contact*, Vol. 27, No. 3 (1989), pp. 158–164. According to this technique, a light-emitting element and a light-receiving element are arranged in such a manner that angle of incidence and angle of reflection take on the value of the Brewster angle (53°). This utilizes the fact that since a wet road surface approximates a mirror surface, the degree of polarization approaches unity, whereas in the case of a dry road surface, the degree of polarization approaches zero.

However, this technique is such that an asphalt road surface is identified as being in either a wet condition or a dry condition; gravel roads and snow-covered roads cannot be discriminated. Further, since the angles at which the light-emitting element and light-receiving element are arranged are determined by the Brewster angle, precise positioning is required and the light-transmitting and light-receiving elements must be provided quite far apart.

Further, road-surface condition estimation suited for application to antiskid control is available ("Road-Surface Estimation Using Fuzzy Logic", by Katsuhiro Oba et. al., *Jidosha Gijutsukai*, Corporate Juridical Person, *Gakujutsu Koenkai Zensatsushu* 881, May, 1988, 881028). However, since this technique is suitable for application to an antiskid system, it lacks universality.

DISCLOSURE OF THE INVENTION

The present invention provides a road surface discriminator capable of being expanded to discriminate road surface conditions of a wide variety of types, thereby making many applications possible.

The basic structure of the road surface discriminator according to the present invention is as follows: Specifically, the road surface discriminator comprises a first light source for projecting light toward a road surface; a first spatial filter light-receiving optical system having first spatial filter means and first light-receiving means, wherein reflected light from the road surface on which light is projected from the first light source is received by the first light-receiving means through the first spatial filter means and the first-light receiving means outputs an electric signal representing the reflected light received; a second light-receiving optical system having second light-receiving means, Wherein reflected light from the road surface on which light is projected from the first light source is received by the second light-receiving means and the second-light receiving means outputs an electric signal representing the reflected light received; a first signal processing circuit for detecting intensity a center-frequency component, which corresponds to the spatial frequency of the first spatial filter means, from the electric signal outputted by the first spatial filter light-receiving optical system; a second signal processing circuit for detecting intensity of a low-frequency component, which corresponds to a spatial frequency lower than the spatial frequency of the first spatial filter means, from the electric signal outputted by the second light-receiving optical system; and discriminating means for discriminating conditions of the road surface based upon the intensity of the center-frequency component detected by the first signal processing circuit and the intensity of the low-frequency component detected by the second signal processing circuit.

Preferably, the first light source, the first spatial filter light-receiving optical system and the second light-receiving optical signal are arranged so that the first- and second-light receiving means receive diffusely reflected light from the road surface.

In a first embodiment of the invention, the second light-receiving optical system is contained in the first spatial filter light-receiving optical system and the second light-receiving means is the first light-receiving means. The electric signal outputted by the first light-receiving means is applied to the first signal processing circuit and the second signal processing circuit.

In a second embodiment, part of the second light-receiving optical system is contained in the first spatial filter light-receiving optical system and the second light-receiving means receives reflected light that does not pass through the first spatial filter means.

In a third embodiment, the second light-receiving optical system has a second spatial filter having a spatial frequency lower than the spatial frequency of the first spatial filter means. The second light-receiving means receives reflected light through the second spatial filter.

The spatial frequency characteristic (especially of diffused light) exhibited by a road surface has a distinct feature in the spatial frequency spectrum. Specifically, intensity is high in the region of low spatial frequency; the higher the spatial frequency, the lower the intensity. The inventors have discovered that the intensity differs in dependence upon the road surface conditions in this low-frequency region of high intensity. In other words, the inventors have found that the road surfaces conditions are ranked as follows in order of decreasing intensity: snow, gravel (earth, sand) and asphalt (concrete).

The spatial frequency (center frequency component) of the first spatial filter optical system is set to a comparatively high portion of the detectable spatial frequency region. In a region of frequency lower than the center frequency, the spatial frequency of the low-frequency component extracted is set to a portion in which intensity will vary as much as possible in dependence upon the road surface conditions.

The intensity of the low-frequency component is standardized (normalized) by the intensity of the center frequency component. As a result, the cause of a fluctuation in amount of light and of a fluctuation in reflectivity, etc., is eliminated. By comparing the standardized low-frequency component intensity with a predetermined threshold value, at least one of snow, gravel and asphalt can be discriminated.

The condition of wetness of a road surface, especially of an asphalt road surface, is discriminated based upon regularly reflected light.

In this case, a second light source for projecting light toward the road surface and a third light-receiving optical system, which includes a third light-receiving element, are provided. The second light source and third light-receiving optical system are arranged in such a manner that the third light-receiving element receives regular reflected light from the road surface on which light is projected from the second light source. The discriminating means discriminates the condition of wetness of the road surface based upon an output signal from the third light-receiving element.

In a preferred embodiment, a light-quantity detector for detecting the quantity of light in the projected light from the second light source is further provided. The discriminating means discriminates the condition of wetness of the road surface based upon a value obtained by normalizing the output signal of the third light-receiving element by the quantity of light detected by the light-quantity detector. As a result, the adverse effects of a fluctuation in the quantity of light of the second light source can be eliminated.

In another preferred embodiment, the third light-receiving optical system is contained in the first spatial filter light-receiving optical system. The third light-receiving element is the first light-receiving element.

In this case, separating means is provided for separating an output signal of the first light-receiving element into a first signal component, which results from the projected light of the first light source, and a second signal component, which results from the projected light of the second light source. The first signal processing circuit detects the intensity of the center-frequency component of diffused light based upon the first signal component separated by the separating means. A third signal processing circuit is provided for detecting the intensity of the center-frequency component of regular reflected light based upon the second signal component separated by the separating means.

The discriminating means discriminates the condition of wetness of the road surface based upon a ratio of the intensity of the center-frequency component of regular reflected light to the intensity of the center-frequency component of diffused light. This ratio becomes fairly large in the case of a wet road surface, so that an accurate judgment can be expected.

The separation of the above-mentioned signals can be implemented in the following manner: A drive circuit is provided for driving the first light source and the second light source based upon respective signals of different phase or different frequency. The separating means is implemented by a demodulating circuit for demodulating respective signals that have been modulated by signals of different phase or different frequency.

The fact that a road surface is frozen also can be determined. A temperature sensor for measuring road surface temperature or air temperature is provided. When the discriminating means has discriminated wetness, the discriminating means determines that the road surface is frozen in a case where the temperature sensed by the temperature sensor is less than a predetermined value.

A snow-covered road also can be judged by a diffused light component. Specifically, a fourth signal processing circuit is provided for detecting a diffused light component of very low frequency based upon the output signal of the first light-receiving element or second light-receiving element. The discriminating means judges that a road surface is snowy in a case where the diffused light component detected by the fourth signal processing circuit exceeds a predetermined value.

Preferably, the first light source is composed of a plurality of light-emitting elements and a plurality of lenses corresponding to the light-emitting elements and disposed in front of them. The optic axis of each light-emitting element and the optical axis of the lens corresponding to it are so disposed as to be offset. As a result, the projected light of the first light source is prevented from spreading.

The first signal processing circuit includes a tracking band-pass filter as one example. The tracking band-pass filter outputs a signal representing ground speed. The pass band of the tracking band-pass filter is controlled based upon the speed signal. The road surface discriminator is capable of detecting ground speed as well.

The second signal processing circuit includes, as one example, a tracking low-pass filter in which cut-off frequency is controlled based upon the speed signal.

The present invention provides a road surface discriminator having a more simplified structure (especially a more simplified electrical construction). The road surface discriminator comprises a light source for projecting light toward a road surface; a spatial filter light-receiving optical system for receiving diffuse reflected light from the road surface, on which light is projected from the light source, through a spatial filter and outputting an electric signal representing the reflected light received; a signal processing circuit for detecting a center-frequency component, which corresponds to the spatial frequency of the spatial filter, based upon the electric signal outputted by the spatial filter light-receiving optical system; a first counter for counting zero cross points of the center-frequency component outputted by the signal processing circuit; a second counter for counting zero cross points of the electric signal outputted by the spatial filter light-receiving optical system; and discriminating means for discriminating condition of the road surface based upon a count value in the first counter and a count value in the second counter.

At least one of snow, gravel and asphalt is discriminated by the discriminating means in the above structure.

According to one embodiment, the discriminating means performs discrimination and the first and second counters start counting at prescribed times. According to another embodiment, the discriminating means performs discrimination and the first and second counters start counting whenever the count in the first counter reaches a prescribed number.

According to yet another preferred embodiment, the first and second counters are provided in a plurality of pairs. The moment at which counting by the first and second counters starts is set so as to be different for each pair. As a result, accuracy can be maintained and the discrimination period can be shortened.

The simplified road surface discriminator described above also can be so developed as to be capable of discriminating wetness, freezing, etc.

In all of the road surface discriminators described above, the following arrangement is recommended in order to prevent the diffuse reflected light from becoming so large as to saturate the processing circuit in case of snow:

Specifically, there are provided an amplifier circuit for amplifying electric signals inclusive of light-reception signals, and means for controlling the amplification factor of the amplifier circuit in dependence upon result of discrimination performed by the discriminating circuit.

Alternatively, control means is provided for varying the quantity of projected light from the first or second light source in dependence upon result of discrimination performed by the discriminating circuit.

This invention also can be developed to discriminate not only a road surface but also the surface of an object.

The present invention is further applicable to a vehicle slipping warning, to control of braking or acceleration for antiskid purposes, and to vehicle suspension control.

The present invention provides a vehicle or mobile body having a road surface discriminator.

Other features of the present invention will become more apparent in the description of embodiments with reference being made to the drawings.

BRIEF DESCRIPTION OF THE DRAWINGS

FIGS. 1 through 3 illustrate the optical structure (a first aspect thereof) of a road surface discriminator, in which FIG. 1 is a perspective view, FIG. 2 a longitudinal sectional view and FIG. 3 a front view of an optical system for regular reflected light;

FIGS. 4 and 5 schematically illustrate an example of the structure of a light source for illuminating the surface of a road, in which FIG. 4 is a plan view and FIG. 5 a sectional view;

FIG. 32 is a waveform diagram showing a signal in case of a snow-covered road;

FIG. 41 illustrates a table of optimum slip factors;

BEST MODE FOR CARRYING OUT THE INVENTION

A road surface discriminator generally is installed in a vehicle. Light from the optical system of the road surface discriminator is projected toward the surface of a road and light reflected from the road surface is received by the optical system. The surface condition of the road is discriminated by a signal processing circuit based upon an electric signal obtained from the optical system.

Typical examples of road surface conditions identified in this embodiment are as follows:

snow;

asphalt (or concrete); and gravel (earth (soil) or sand).

In this embodiment, whether or not a road surface is frozen also is discriminated.

Furthermore, according to this embodiment, an asphalt (concrete) road surface can subdivided into the following two conditions:

wet asphalt (concrete) and dry asphalt (concrete).

Accordingly, the modes of discrimination include identifying any one road surface condition among the above-mentioned road surface conditions and distinguishing between any two or more road surface conditions. Representative examples of modes of discrimination are as follows:

a. identification of a snowy road;

b. identification of an asphalt road (concrete road);

c. identification of a gravel road (earth or sandy road);

d. identification of a frozen road surface;

e. identification of a wet asphalt road;

f. identification of a dry asphalt road;

g. distinguishing between a snowy road and an asphalt road;

h. distinguishing between a snowy road and a gravel road;

i. distinguishing between an asphalt road and a gravel road;

j. distinguishing among a snowy road, an asphalt road and a gravel road;

k. discriminating whether an asphalt road is in a wet condition or a dry condition in case of g, i and j above; and m. discriminating whether a road surface is frozen or not in case of g, h, i, j and k above.

In the embodiments illustrated below, the description is focused on the mode m, which has the most types of road surface conditions to be discriminated. It goes without saying that a road surface discriminator apparatus and method in which road surface discrimination of any mode among a~k above is possible can be realized by extracting solely the required portion of the optical structure, the required portion of the electrical configuration and the required portion of an algorithm.

(1) Optical structure (first aspect thereof) of road surface discriminator

Figure 1:
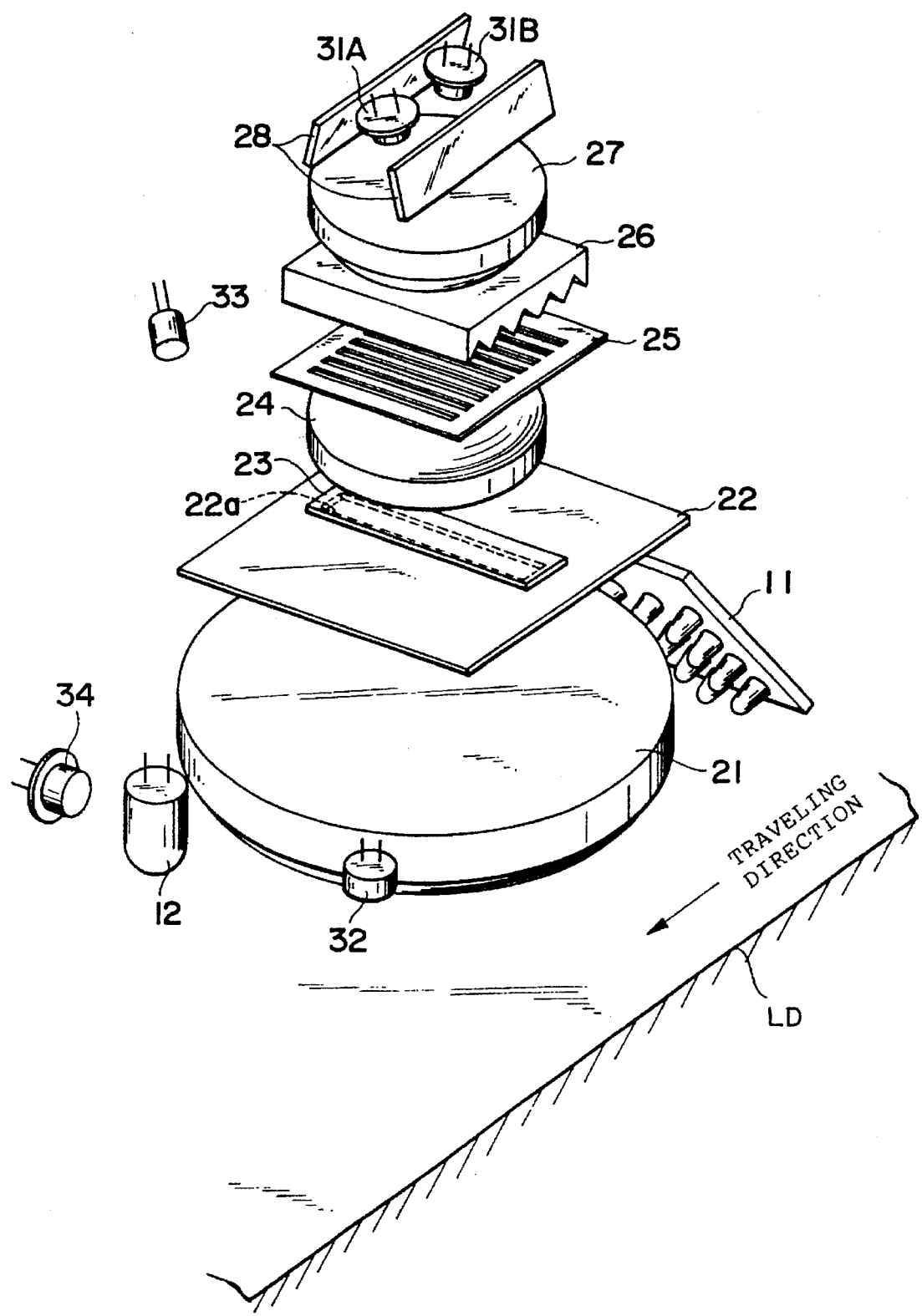
Figure 2:
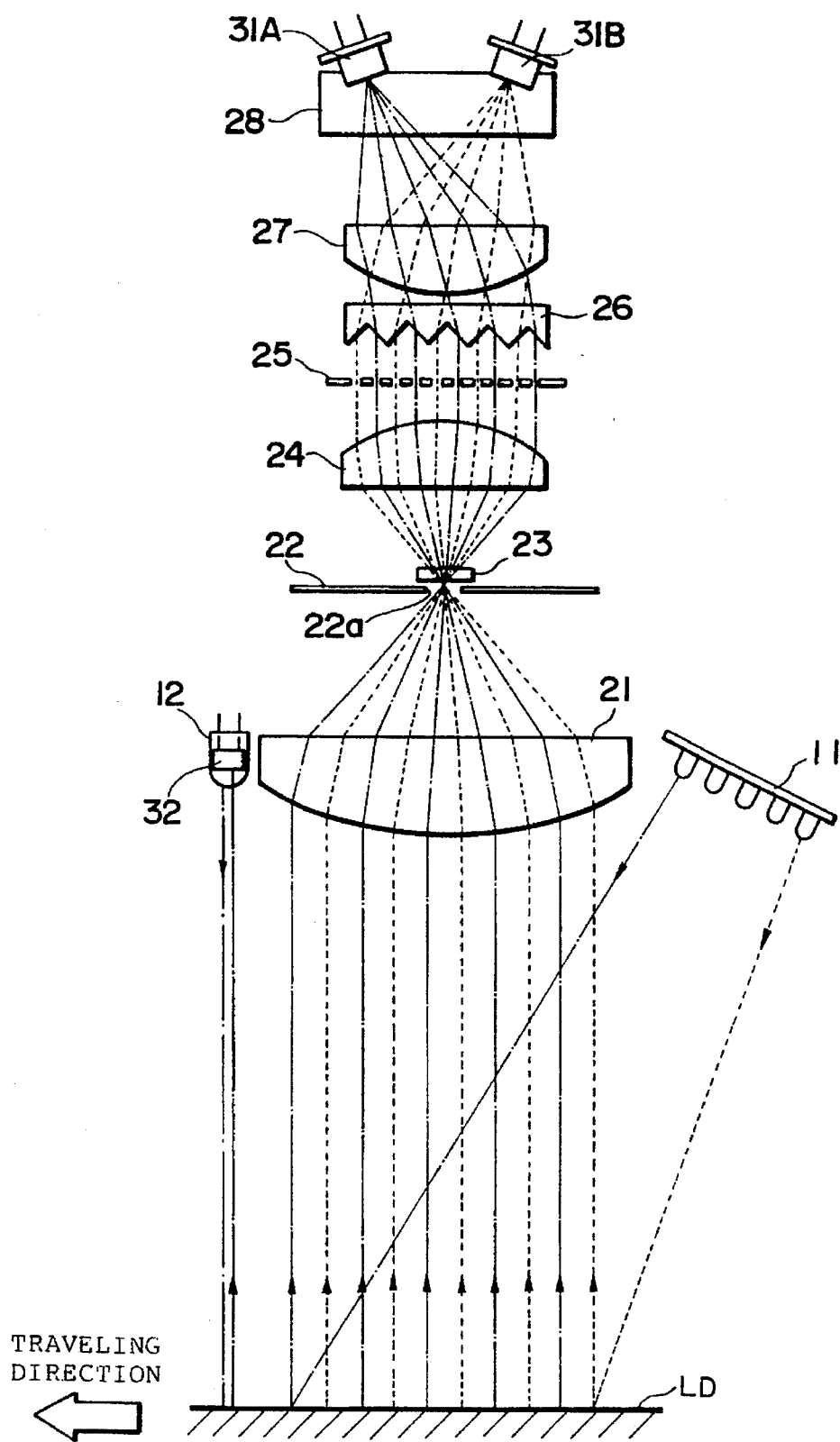
Figure 3:
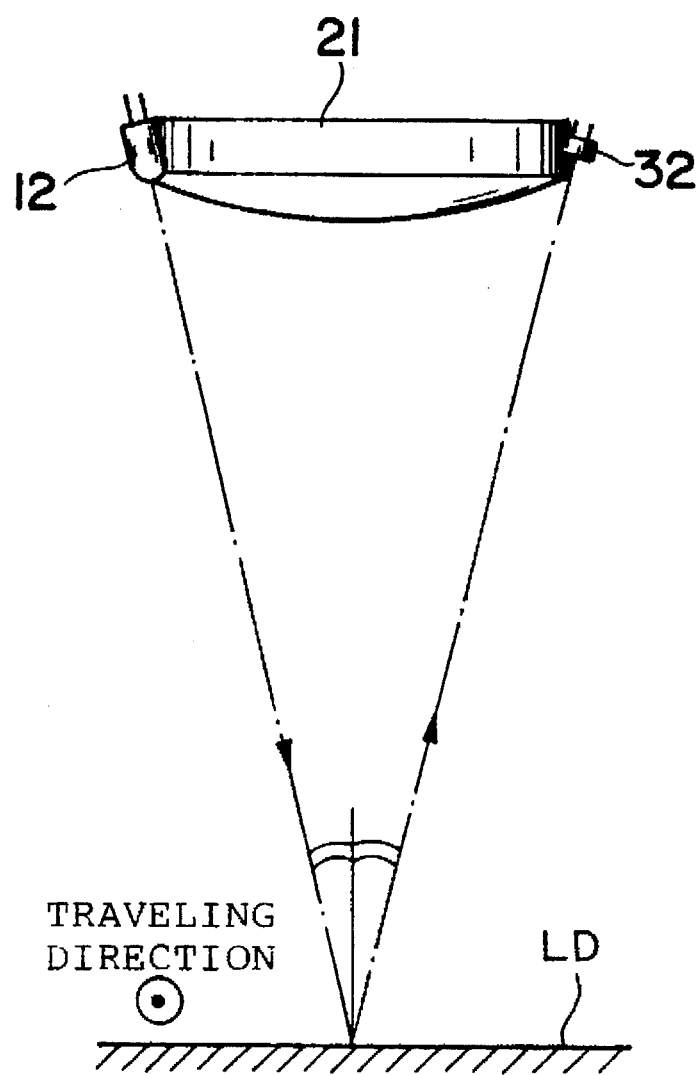
Figure 8:
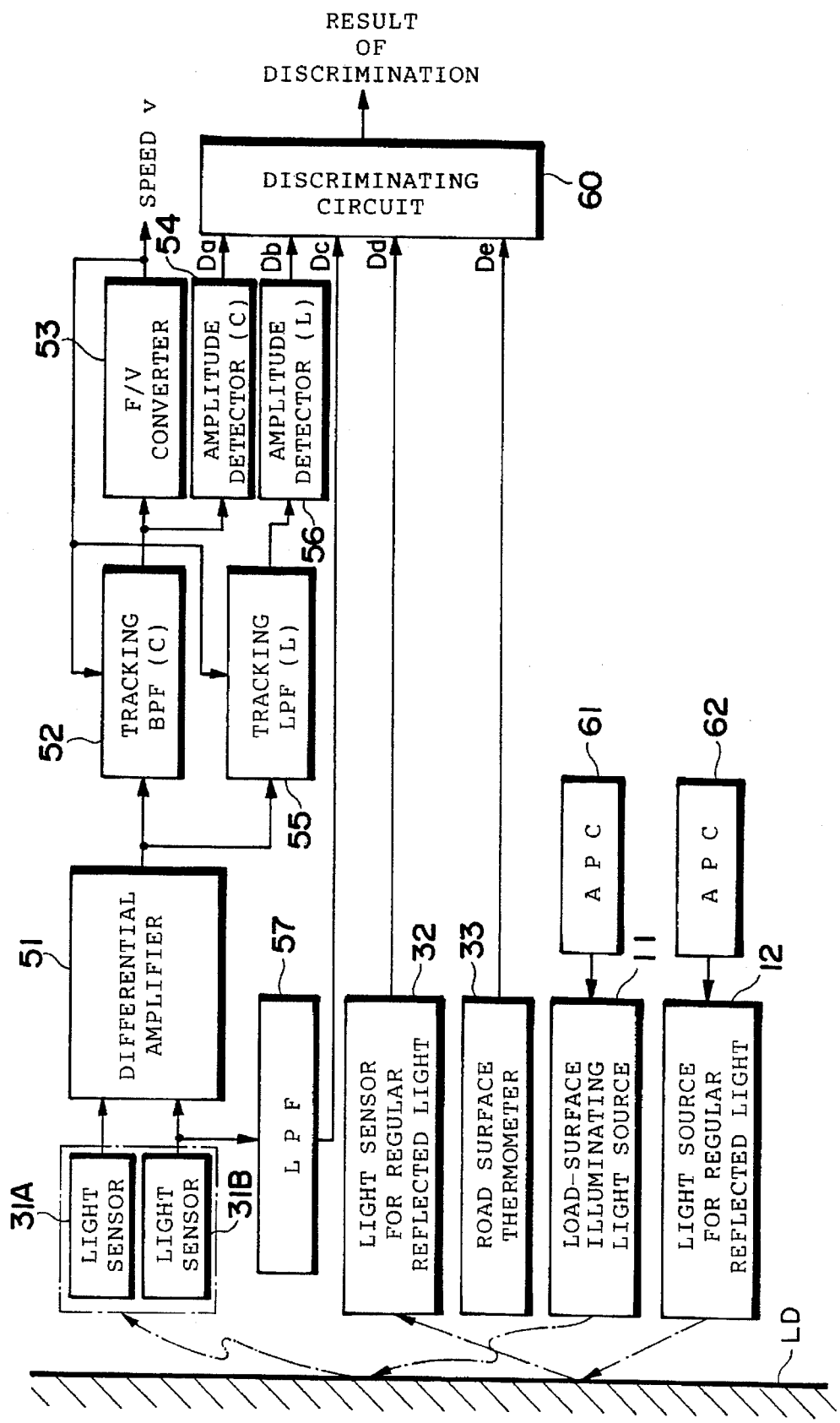
FIG. 8 is a block diagram illustrating the electrical configuration (a first aspect thereof) of the road surface discriminator.

FIGS. 1 through 3 illustrate a first example of the optical structure of a road surface discriminator. In order to reduce the number of drawings, all optical elements necessary in the optical system to actually execute all of several road surface discrimination algorithms described in detail later are drawn. Conversely speaking, this optical system also includes optical elements not necessary for the purpose of executing a certain road surface discrimination algorithm. It can be said that FIGS. 1 through 3 express all optical elements contained in the optical systems of several road surface discriminators. This fact applies to the signal processing circuit of FIG. 8 as well. Accordingly, when this optical system and the signal processing circuit shown in FIG. 8 are used, road surface discrimination of the above-mentioned mode m is possible. In a case where a road surface discriminator capable of road surface discrimination of any of the above-mentioned modes a~k is implemented, unnecessary optical elements and electrical circuit elements need only be deleted.

A light source 11 for road surface illumination and a light source 12 for regular (specular) reflected light are included in the optical system. The light sources 11 and 12 are constituted by light-emitting diodes. An example of a preferred construction for the light source 11 for road surface illumination will be described later. The light source 11 for road surface illumination projects light obliquely downward in the traveling direction of the vehicle. The light source 12 for regular reflected light projects light obliquely downward in a direction orthogonal to the traveling direction. Preferably, the wavelengths of the light projected from the light sources 11 and 12 differ. As a result, the light of these light sources reflected from a road surface LD (the road also is represented by LD) can be separated by an optical filter.

A light-receiving optical system for receiving diffuse reflected light from the road surface includes a light-receiving lens 21, a slit plate 22 and a collimating lens 24. The focal point of the light-receiving lens 21 and the focal point of the collimating lens 24 are at the same position, and a slit (diaphragm) 22a in the slit plate 22 is situated at these focal points. The slit 22a extends in a direction perpendicular to the vehicle traveling direction. Such an optical system is referred to as a telecentric optical system. That is, of the reflected light from the road surface LD, only light rays perpendicular to the road surface LD and parallel to one another (in FIG. 2) converge at the focal point of the light-receiving lens 21 and pass through the slit 22a. Light rays that have passed through the slit 22a are rendered parallel by the collimating lens 24. The light from the light source 11 impinges obliquely on the road surface LD. Only light reflected perpendicularly from the light source LD passes through the slit 22a. Thus, only diffuse reflected light from the road surface LD is collimated by the collimating lens 24 and enters a spatial filter optical system. (That is, regular (specular) reflected light from the road surface LD does not enter the spatial optical system.)

Preferably, an optical filter 23 is placed at the position of the slit 22a of slit plate 22. This filter 23 exhibits wavelength selectivity for passing only the light projected from the light source 11 for illuminating the road surface. As a result, light from the light source 12 for regular reflected light and other extraneous light (sunlight, light from road illuminating lamps, etc.) is prevented from impinging upon the spatial filter optical system. The light projected from the light source 11 preferably is infrared light.

The spatial filter optical system includes a grating plate (slit array) 25, a prism array 26, a condenser lens 27 and two light sensors (light-receiving elements, e.g., photodiodes or phototransistors) 31A, 31B. The prism array 26 basically acts as a spatial filter.

The prism array 26 is constituted by a number of prisms. The prisms are arrayed in the traveling direction of the vehicle and extend in a direction perpendicular to the traveling direction. The prism array 26 preferably is molded as a unitary body. The light rays rendered parallel by the collimating lens 24 are separated by refraction alternately back and forth (with the traveling direction serving as the reference) each at a fixed pitch width by the prisms of the prism array 26. The separated light rays are each condensed by the condenser lens 27 and impinge upon the two light sensors 31A, 31B.

The light indicated by the dots-and-dashes lines in FIG. 2 impinges upon the light sensor 31A, and the light indicated by the dots lines impinges upon the light sensor 31B. The width these light rays depends upon the period at which the prisms are arrayed. The prism array period determines the characteristic (period) of the spatial filter.

A number of slits arrayed in the traveling direction of the vehicle and extending in the direction perpendicular to the traveling direction are formed in the grating plate (slit array) 25. The period at which these slits are arrayed is half the array period of the prisms of prism array 26. Of the light rendered parallel by the collimating lens 24, the light which has passed through the slits impinges upon the prism array 26 so as to be separated, as described above, and the separated light is received by the light sensors 31A, 31B alternately in space. The grating plate 25 prevents stray light from impinging upon prism array 27.

The light sensors 31A and 31B are arranged in spaced relation in the direction of vehicle travel. The spacing is decided by the period of the prisms in the prism array 26 and the magnification of the condenser lens 27. Mirrors 28 are provided on both sides of the light sensors 31A and 31B and act in such a manner that light not condensed on the light-receiving surfaces of the light sensors 31A, 31B by the lens 27 will impinge upon the light sensors 31A, 31B as much as possible.

As will be illustrated later, the output signals from the two light sensors 31A and 31B are applied to a differential amplifier circuit and the difference between them is calculated. The output signal of the differential amplifier circuit contains a frequency component (which is dependent upon the speed of the vehicle) corresponding to a spatial frequency component representing the condition of the road surface that causes a fluctuation in diffuse reflected light, wherein the road surface condition includes roughness of the road surface.

The light rays incident upon the light sensor 31A and the light rays incident upon the light sensor 31B are out of phase by a period which is half the spatial period selected by the spatial filter. Accordingly, the spatial center frequency component is doubled by taking the difference between the output signals of the two light sensors 31A and 31B. Direct-current (DC) components are canceled out mainly by this differential processing.

The light source 12 for regular reflected light and a light sensor 32 for sensing regular reflected light are arranged in a plane perpendicularly intersecting the traveling direction of the vehicle in such a manner that the angle of incidence of projected light from the light source 12 upon the road surface LD and the angle of reflection of reflected light from the road surface incident upon the light sensor 32 are made equal. Since the angle of incidence and the angle of reflection can be made smaller than the Brewster angle (53°), a reduction in the size of the optical system can be expected. Preferably, an optical filter which allows passage solely of light having the wavelength of the projected light from the light source 12 and a condenser lens are placed in front of the light sensor 32.

A road surface thermometer 33 measures the temperature of the road surface and is implemented by an infrared radiation thermometer, by way of example. The road surface thermometer 33 need not be included in the optical system and may be provided at another suitable location in the vehicle.

Furthermore, a light sensor 34 for monitoring the amount of projected light is provided to receive part of the projected light from the light source 12 for regular reflected light. The light sensor 34 will be described later.

Figure 4:
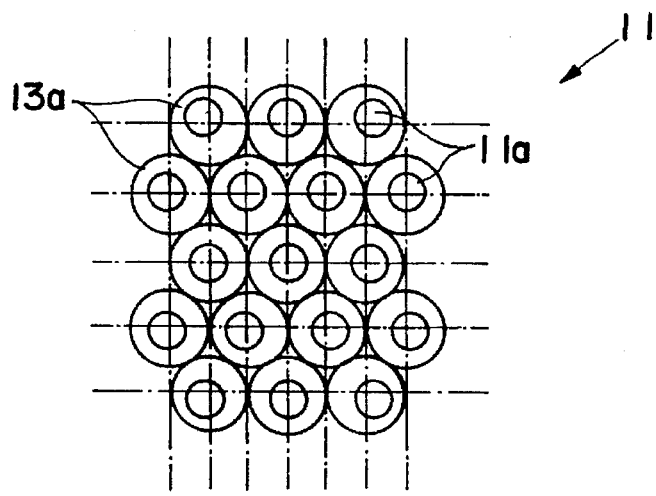
Figure 5:
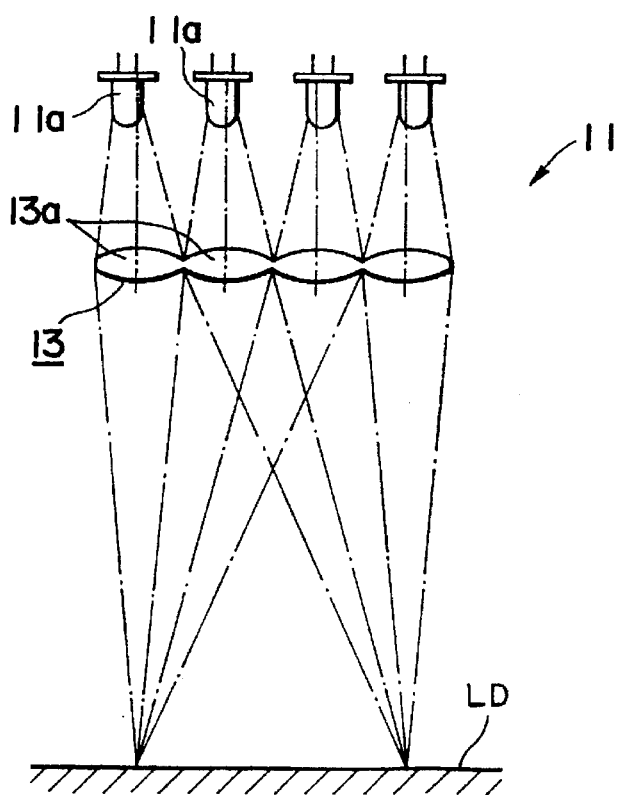

FIGS. 4 and 5 illustrate an example of the construction of the light source 11 for illuminating the road surface. The light source 11 is constituted by light-emitting elements (e.g., light-emitting diodes) 11a arrayed in two dimensions, and a lens array 13 having a number of convex lenses 13a arrayed in two dimensions to condense and then project light from the light-emitting elements 11a. One lens 13a corresponds to one light-emitting element 11a. The optic axes in pairs of the light-emitting elements and lenses situated in the vicinity of the center substantially coincide. However, the closer the position is to the periphery, the more the optic axes of the light-emitting elements 11a and the optic axes of the corresponding lenses 13a are offset from each other so as to make the light condensed and projected by the lenses 13a come as close to the center as possible. As a result, the light projected from the light source 11 does not spread significantly but diverges to an area that is as small as possible to illuminate the road surface LD. In other words, the light can be utilized more efficiently and it is possible to reduce the number of light-emitting elements constructing the light source 11.

Figure 6:
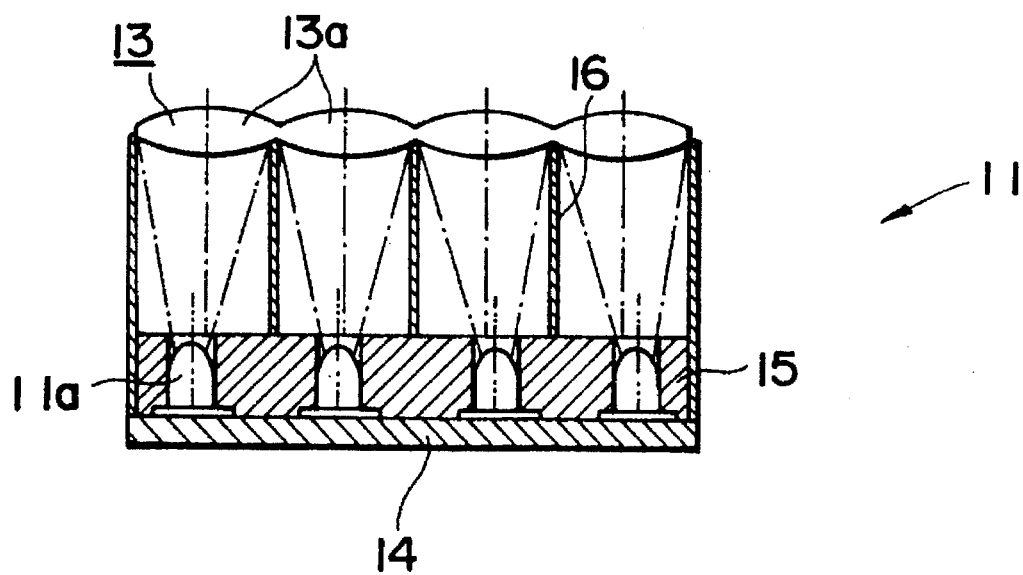
FIG. 6 is a sectional view showing a specific example of a light source for illuminating a road surface.

FIG. 6 illustrates the road surface illuminating light source 11 in a form closer to that used in actuality. The multiplicity of light-emitting elements 11a are mounted on a printed circuit board 14 and connected to a wiring pattern on the board 14. The light-emitting elements 11a are fitted into recesses in a holder 15 secured to the board 14. Light shielding plates 16 are provided so as to cover the periphery of the light-emitting elements 11a (with the exception of the forwardly facing parts thereof). The lens array 13 is placed in front of the light-emitting elements 11a and is fixed to the light shielding plates 16. The optic axes of the light-emitting elements 11a and their corresponding lenses 13a are offset from each other.

(2) Principles of road surface discrimination

Figure 7:
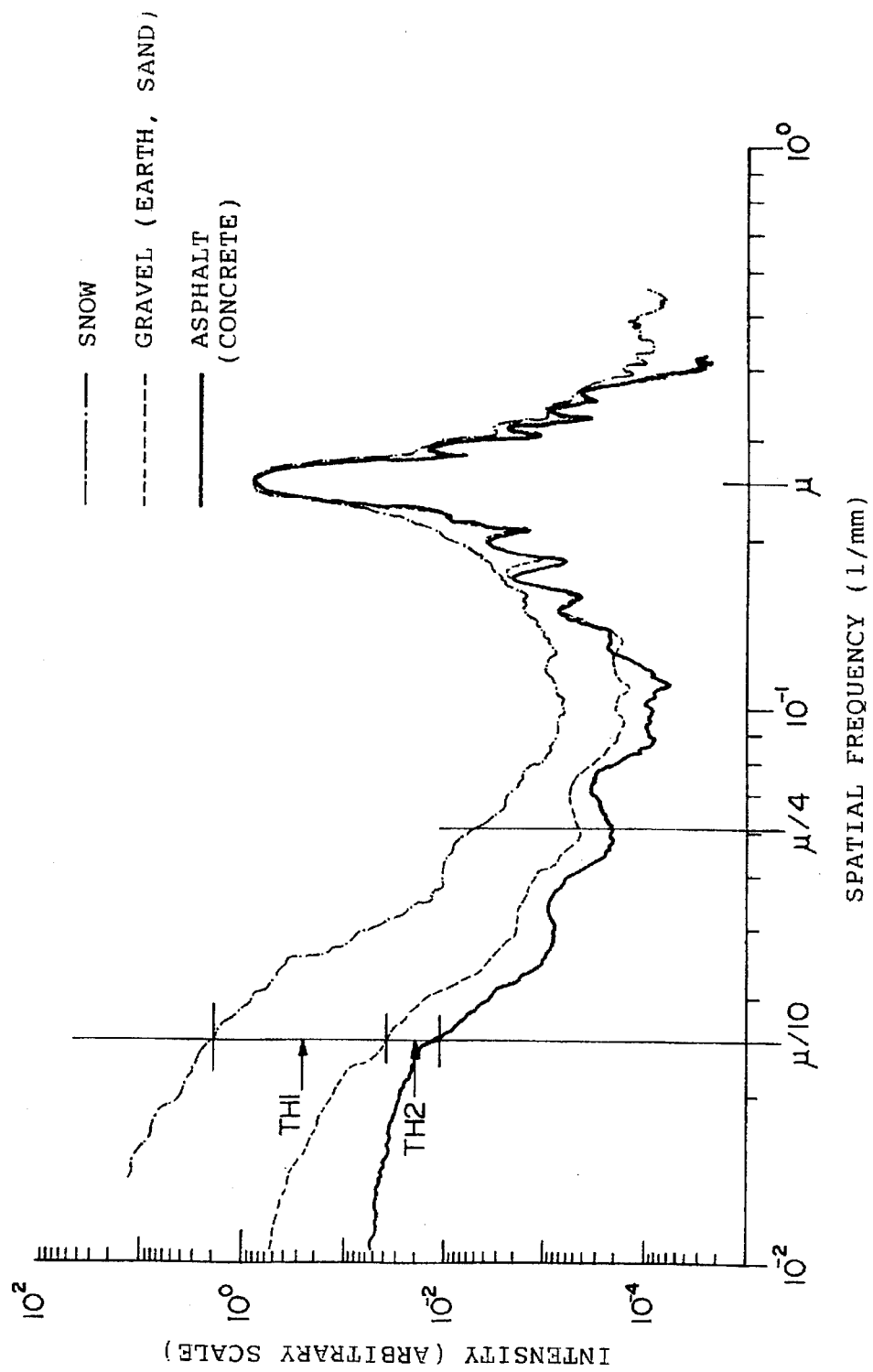
FIG. 7 is a graph showing results of actual measurement.

FIG. 7 illustrates an example of actual measurement of a spatial frequency spectrum represented by a differential signal between the output signal of the light sensor 31A and the output signal of the light sensor 31B. This graph is the result of actually measuring three types of road surface conditions, namely snowy roads, gravel roads and asphalt roads.

The frequency (electrical center frequency) f of a center frequency signal component contained in the differential signal between the outputs of the light sensors 31A and 31B is represented by the product of a spatial center frequency $\mu$, which is selected by the construction of the spatial filter, and the speed v of the vehicle, as follows:

$$f = \mu \times v \qquad \text{Eq. (1)}$$

The spatial center frequency $\mu$ is uniquely decided by the construction of the spatial filter. The road surface period (the period of the road surface condition that causes a change in the diffuse reflected light, wherein the road surface condition includes roughness of the road surface) selected by the spatial filter is set here at 4 (mm). FIG. 7 shows the result of subjecting an electric signal acquired by actual measurement to a Fourier transform (FFT: fast Fourier transform) so as to obtain a frequency spectrum, and then normalizing the frequency spectrum by the spatial center frequency $\mu$. Further, data regarding snow, gravel and asphalt is normalized in such a manner that the peak values (intensities) in the spatial center frequency $\mu$ will coincide.

As will be understood from the graph, there are large and distinct differences between asphalt, snowy and gravel roads in terms of the intensities of spatial frequency components (in the band below $\mu/4$, for example) lower than the spatial center frequency $\mu$. These differences are on the order of one place (factor of ten) or more. The lower the spatial frequency, the larger the difference in intensity in the three types of road surface conditions.

Accordingly, it is possible to distinguish among a snowy road, a gravel road and an asphalt road based upon a value [referred to as "(low-frequency component intensity/center-frequency component intensity)"=Db/Da] obtained by normalizing the low-frequency component intensity (at a frequency of $\mu/4$ or $\mu/10$, for example) of the spatial frequency by the center-frequency component intensity. Threshold values TH1, TH2 used to distinguish among these roads should be decided as values intermediate the value Db/Da. In FIG. 7, a road is discriminated to be a snowy road if the value Db/Da is greater than the threshold value TH1, a gravel road if the value Db/Da lies between the threshold values TH1 and TH2 and an asphalt road if the value Db/Da is less than the threshold value TH2.

The snowy road mentioned here does not refer to a road covered with new snow (the entire surface of which is pure white) but rather to a snow surface worn down by vehicular and pedestrian traffic so as to take on a comparatively bumpy condition (i.e., considerably more bumpy than a gravel road, which road condition causes a change in the amount of diffuse reflected light).

An earthen or sandy road in which gravel is mixed also exhibits the same tendency, and the frequency spectrum of a concrete road is substantially the same as the spectrum of an asphalt road.

(3) Electrical configuration (first aspect) thereof) of road surface discriminator FIG. 8 illustrates an example of the configuration of a signal processing circuit included in the road surface discriminator.

The output signals of the light sensors 31A and 31B are applied to a differential amplifier circuit 51, which outputs a signal representing the difference between these two signals.

Figure 9:
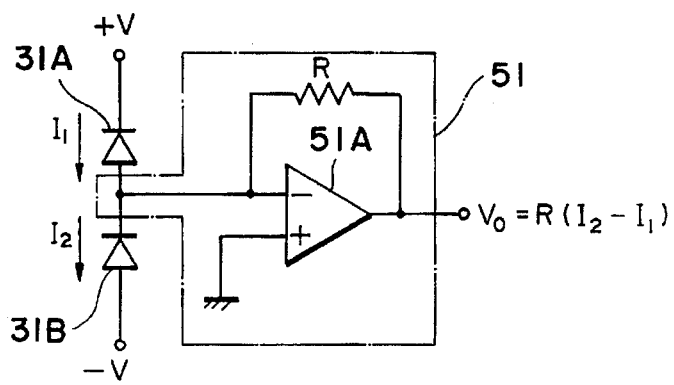
FIG. 9 is a circuit diagram showing a specific example of a differential amplifier circuit.

An example of the constructions of the light sensors 31A, 31B and differential amplifier circuit 51 are illustrated in FIG. 9. The light sensors 31A and 31B are each constituted by a photodiode, with the photodiodes being serially connected. The differential amplifier circuit 51 is constituted by an operational amplifier 51A having a feedback resistor R. The difference between a current I1 which flows into the photodiode 31A and a current I2 which flows into the photodiode 31B is calculated at the node of the photodiodes and the difference current enters the operational amplifier 51A. The operational amplifier 51A converts the input difference current into a voltage signal $V_0$ and delivers this signal. The output voltage $V_0$ is given by the following equation:

$$V_0 R(I_2 - I_1) \qquad \text{Eq. (2)}$$

The output voltage $V_0$ of the differential amplifier circuit 51 is applied to a tracking band-pass filter [tracking BPF (C)] 52 and a tracking low-pass filter [tracking LPF (L)] 55.

The output signal of the tracking BPF 52 is applied to a frequency/voltage (F/V) converter circuit 53. The output signal of the F/V converter circuit 53 represents the speed (ground speed) v of the vehicle in which the road surface discriminator is installed. The output of the F/V converter circuit 53 is fed back to the tracking BPF 52 and tracking LPF 55 and is used to change the cut-off frequencies (frequency bands) of these filter circuits to follow up the vehicle speed v.

The output signal of the tracking BPF 52 enters an amplitude detector circuit 54 as well. The amplitude detector circuit 54 outputs a signal representing the center-frequency component intensity Da described above.

The output signal of the tracking LPF 55 enters an amplitude detector circuit 56. The amplitude detector circuit 56 outputs a signal representing the low-frequency component intensity Db described above.

Figure 10:
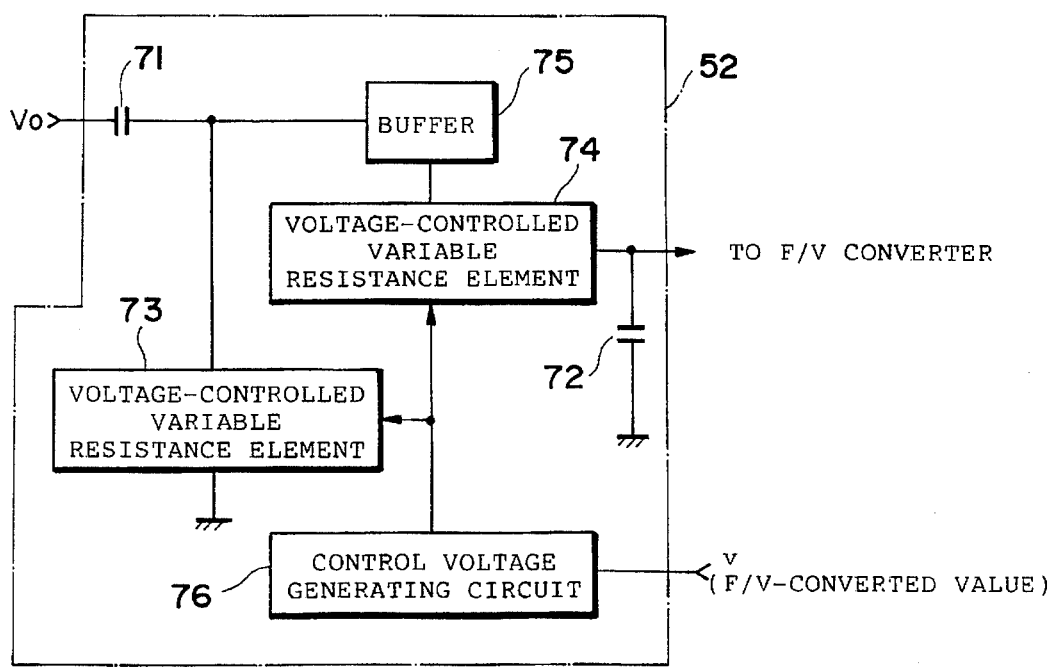
FIG. 10 is a circuit diagram showing a specific example of a tracking band-pass filter.

An example of the construction of the tracking BPF 52 is illustrated in FIG. 10. The tracking BPF 52 includes a high-pass filter (HPF) and a low-pass filter (LPF) connected serially via a buffer amplifier 75. The HPF comprises a condenser 71 and a voltage-controlled variable resistance element 73. The LPF comprises a capacitor 72, a voltage-controlled variable resistance element 74. The voltage-controlled variable resistance elements 73, 74 are constituted by FETs, by way of example. A control voltage from a control voltage generating circuit 76 is applied to the elements 73, 74 and the resistance values of the elements 73, 74 vary in conformity with the control voltage. A change in the resistance values of the elements 73, 74 brings about a change in the cut-off frequencies of the HPF and LPF. The pass band of the tracking BPF 52 is the band between the cut-off frequency of the HPF and the cut-off frequency of the LPF (the latter cut-off frequency being higher than that of the HPF). The control voltage generating circuit 76 generates a control voltage commensurate with the output voltage signal (which represents the vehicle speed v) of the F/V converter circuit 53.

If, by way of example, the period (of the roughness) of the road surface selected by the spatial filter in the above-described optical system is 5 (mm), then the spatial center frequency $\mu$ will be 0.2 (mm$^{-1}$). Let v (Km/h) represent the speed (ground speed) of the vehicle.

$$v(\text{Km/h}) = 1000 \ v/3.6 \ (\text{mm/s}) \qquad \text{Eq. (3)}$$

The center frequency f of the electric signal obtained from the differential amplifier circuit 51 is as follows, based upon Equation (1):

$$f = \mu \times v = 200 \ v/3.6 \ (\text{Hz}) \qquad \text{Eq. (4)}$$

Accordingly, it will suffice to set the center frequency of the pass band of tracking BPF 52 to the frequency indicated by Equation (4) and to vary the center frequency in dependence upon the vehicle speed v in accordance with Equation (4).

The tracking LPF 55 has a construction identical (except for the fact that the cut-off frequency is different) with that of the LPF (composed of the capacitor 72, voltage-controlled variable resistance element 74 and control voltage generating circuit 76) in the tracking BPF 52, and the cut-off frequency thereof varies in dependence upon the vehicle speed v.

When the frequency of the low-frequency components to be extracted by the tracking LPF 55 is set to be 1/10 of the center frequency, the cut-off frequency of this filter should be made 20 v/3.6 (Hz), with reference to Equation (4).

Figure 11:
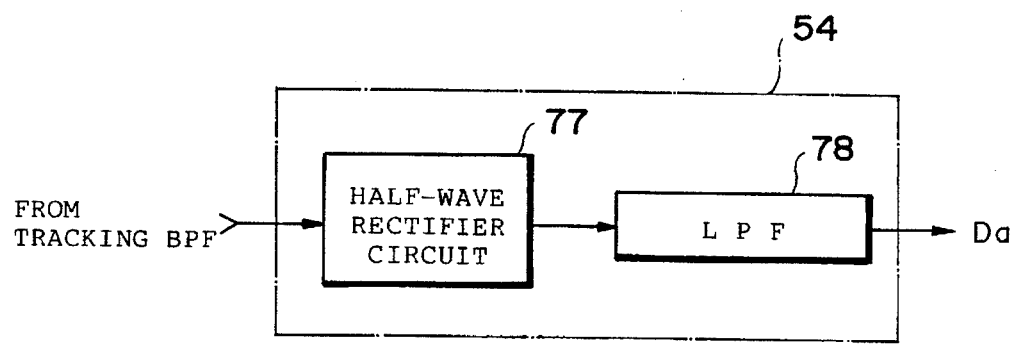
FIG. 11 is a block diagram showing a specific example of an amplitude detector circuit.

A specific example of the construction of the amplitude detector circuit 54 is shown in FIG. 11. The circuit 54 is constituted by a half-wave rectifier circuit 77 and a low-pass filter (LPF) 78. A full-wave rectifier circuit can also be used instead of the half-wave rectifier circuit 77. The pass band of the LPF 78 is decided from the standpoint of the response time required for road surface detection. By way of example, if the response time is 0.1 (S) and the LPF 78 is a primary low-pass filter, then the cut-off frequency is 3.7 (Hz).

The output signal of the light sensor 31B (or of the light sensor 31A) is outputted, via a low-pass filter (LPF) 57, as a signal representing amount Dc of diffuse reflected light. The LPF 57 is for removing very low-frequency undulations contained in the output signal of the photoelectric detector 31B. The cut-off frequency of this filter is set to about 1 (Hz) (fixed), by way of example.

The output signal of the light sensor 32 for regular reflected light is a signal representing an amount Dd of regular reflected light. A low-pass filter having an appropriate pass band may be connected to the output side of the light sensor 32.

The output signal of the road surface thermometer 33 is a signal representing road surface temperature De. This may be a thermometer (thermosensitive element) for sensing air temperature rather than the temperature of the road surface. In this case, the thermometer would be provided at a location in contact with the outside air.

The light source 11 for illuminating the road surface and the light source 12 for regular reflection are controlled by automatic power control (APC) circuits 61 and 62, respectively. As a result, the amount of light projected for each of the light sources 11, 12 is held constant at all times.

Fed into a discriminating circuit 60 are the signal outputted by the amplitude detector circuit 54 representing the intensity Da of the center-frequency component, the signal outputted by the amplitude detector circuit 56 representing the intensity Db of the low-frequency component, the signal outputted by the LPF 57 representing the amount Dc of diffuse reflected light, the signal outputted by the light sensor 32 representing the amount Dd of regular reflected light, and the signal outputted by the road surface thermometer 33 representing the road surface temperature De.

The discriminating circuit 60 uses two or more of these input signals to identify or discriminate road surface condition in accordance with road-surface discrimination algorithms described later. Preferably, the discriminating circuit 60 is constituted by a CPU (e.g., a microcomputer), a memory and other periphery circuitry. In such case, the above-mentioned signals Da~De would be applied to the discriminating circuit 60 upon being converted to digital data by an A/D converter circuit.

(4) Road-surface discrimination algorithm (first aspect thereof)

Figure 12:
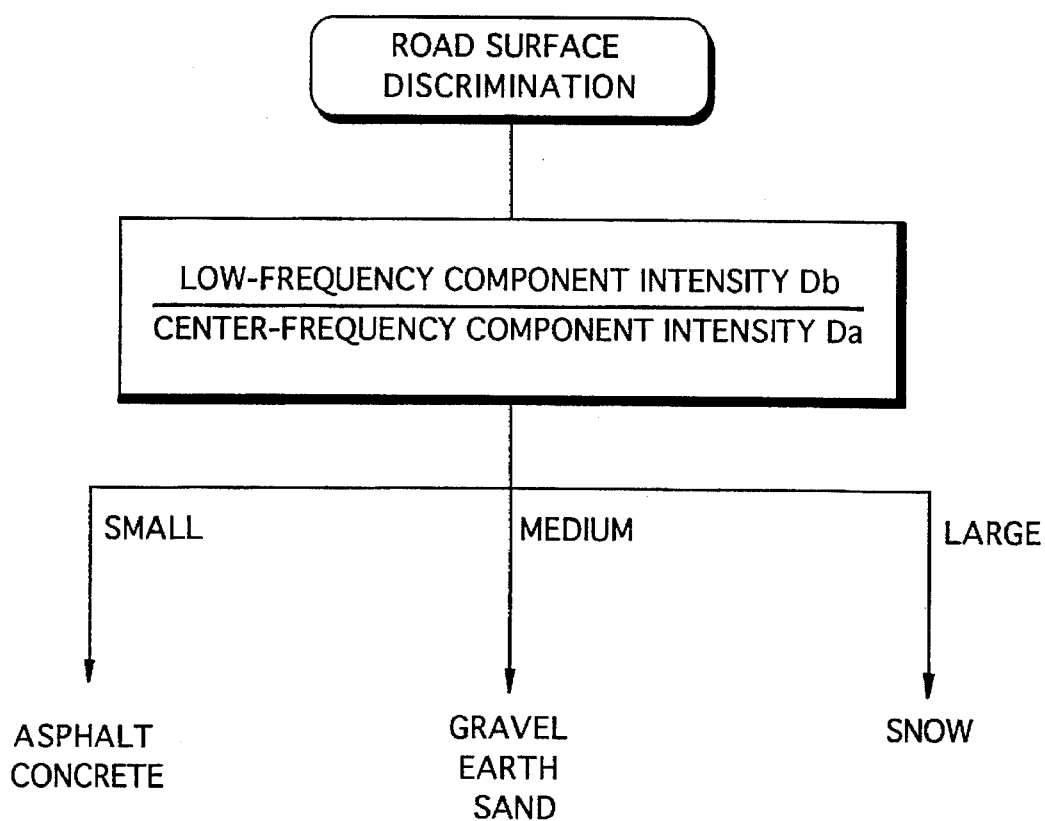
FIG. 12 is a flowchart illustrating a road-surface judgment algorithm (a first aspect thereof)

FIG. 12 illustrates the simplest road-surface discrimination algorithm. Processing in accordance with this road-surface discrimination algorithm is executed in the discriminating circuit 60. This is true for the other road-surface discrimination algorithms as well.

The ratio Db/Da of the low-frequency component intensity Db to the center-frequency component intensity Da is calculated and the ratio is compared with the above-mentioned threshold values TH1 and TH2. The road is judged to be a snowy road if the ratio Db/Da is larger than the threshold value TH1 (this ratio shall be called "large"); a gravel road if the ratio is between the threshold values TH1 and TH2 (this ratio shall be called "medium"); and an asphalt road if the ratio is less than the threshold value TH2 (this ratio shall be called "small").

Solely the threshold value TH1 may be set in the discriminating circuit 60 in advance and only snowy and gravel roads may be discriminated.

Solely the threshold value TH2 (or a suitable value ranging from TH1 to TH2) may be set in the discriminating circuit 60 in advance and only snowy and asphalt roads may be discriminated.

Solely the threshold value TH2 may be set in the discriminating circuit 60 in advance and only gravel and asphalt roads may be discriminated.

(5) Road-surface discrimination algorithm (second aspect thereof)

Figure 13:
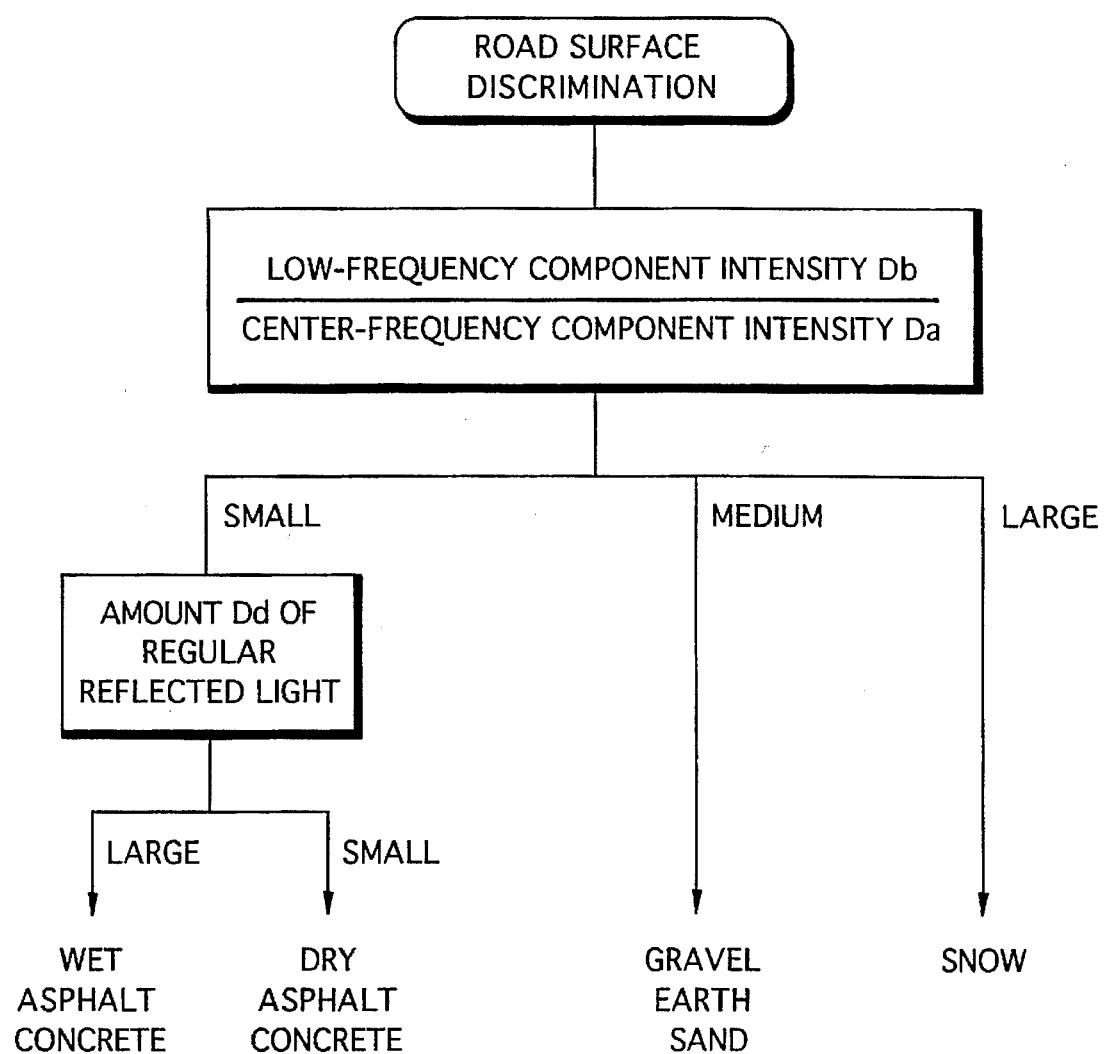
FIG. 13 is a flowchart illustrating a road-surface judgment algorithm (a second aspect thereof)

FIG. 13 illustrates a road-surface judgment algorithm which further uses the signal representing the amount Dd of regular reflected light, provided by the light sensor 32, to discriminate whether an asphalt road is in a wet condition or dry condition.

The road is an asphalt road in a case where the ratio Db/Da is less than the threshold value TH2.

In a case where the surface of an asphalt road is wet, the road surface is in a state approximating a mirror surface and the amount Dd of regular reflected light becomes large in comparison with the dry state. A threshold value is set to a level approximately intermediate the amount of regular reflected light obtained when the asphalt road is in the wet state and the amount of regular reflected light obtained when the asphalt road is in the dry state. The condition is judged to be wet asphalt if the amount Dd of regular reflected light is greater than this threshold value (this amount shall be referred to as "large"), and dry asphalt if the amount Dd of regular reflected light is less than this threshold value (this amount shall be referred to as "small").

Judgment regarding a gravel road and snowy road is the same as that based upon the algorithm shown in FIG. 12.

It goes without saying that an arrangement may be adopted in which only a wet asphalt road and a dry asphalt road are discriminated, judgment regarding a gravel road can be added to this or judgment regarding a snowy road can be added to this.

(6) Road-surface discrimination algorithm (third aspect thereof)

Figure 14:
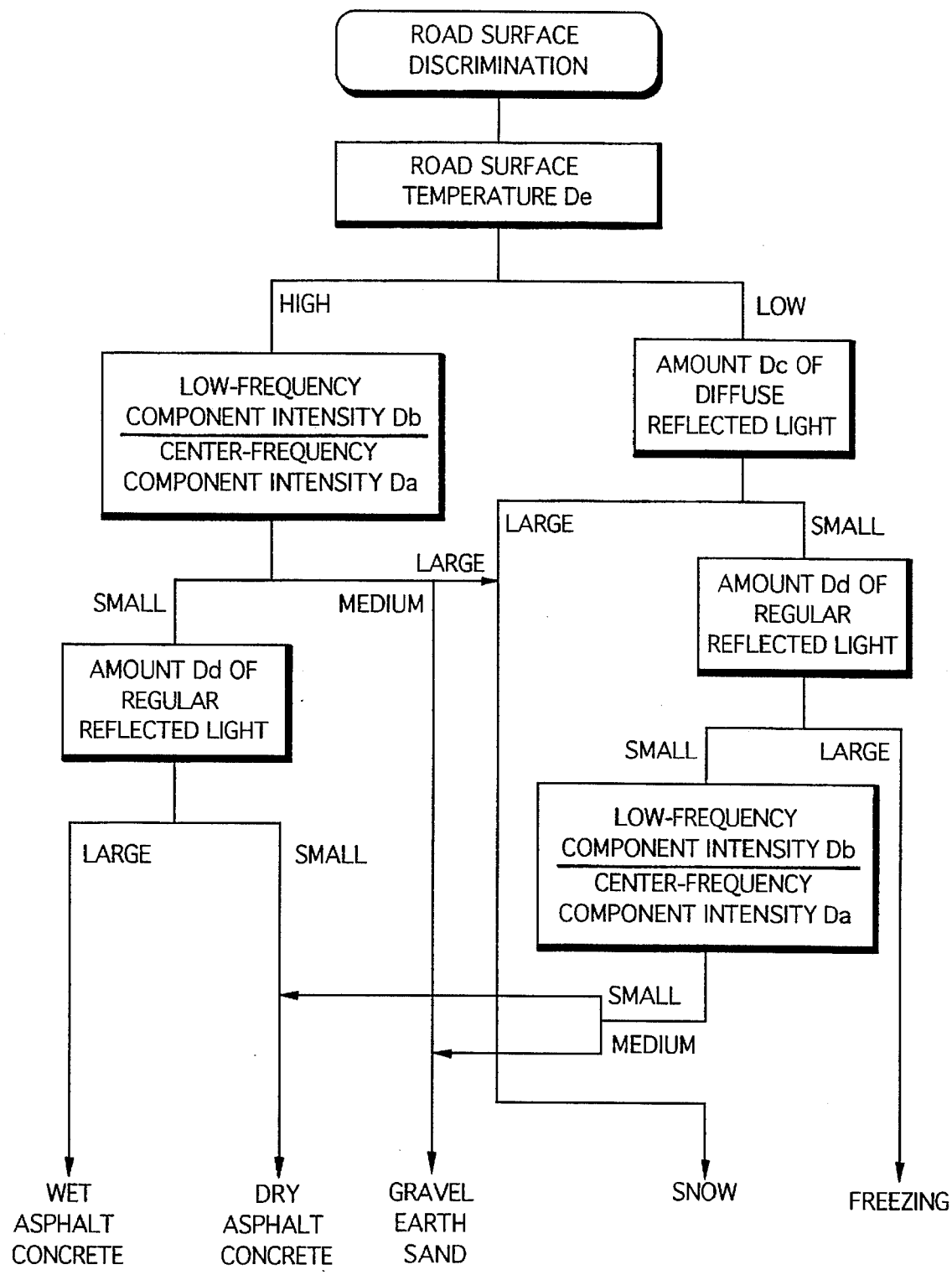
FIG. 14 is a flowchart illustrating a road-surface judgment algorithm (a third aspect thereof)

FIG. 14 is for making a more detailed judgment regarding road surface condition by further utilizing the signal outputted by the LPF 57 representing the amount Dc of diffuse reflected light and the signal outputted by the road surface thermometer 33 representing the road surface temperature De.

In general, water freezes at 0 (° C.). Accordingly, if the road surface temperature De is 0 (° C.) or less, there is the possibility of freezing. It is determined whether the road surface temperature De exceeds the freezing temperature (this temperature shall be referred to as "high") or is equal to or less than the freezing temperature (this temperature shall be referred to as "low").

The freezing temperature need not be exactly 0 (° C.) but may be determined to be optimum temperature based upon experience. In a case where air temperature is used instead of road surface temperature, air temperature at which a frozen road is capable of remaining frozen without thawing or air temperature at which a road surface starts to freeze would serve as the threshold value for making judgments.

Since a frozen road surface approximates a mirror surface in the same manner as a wet road surface, the amount Dd of regular reflected light is "large".

Accordingly, a road surface is judged to be a frozen road surface if the road surface temperature De is "low" and the amount Dd of regular reflected light is "large". In this case, the amount Dc of diffuse reflected light (described in greater detail later) generally is "small".

A road surface is not a frozen road surface if the road surface temperature De is "low" and the amount Dd of regular reflected light is "small". In this case, the road surface condition is judged (to be a dry asphalt road or gravel road) based upon the ratio of low-frequency component intensity Db to the center-frequency component intensity Da. Snow is excluded from this judgment because snow is judged based upon the amount Dc of diffuse reflected light. However, with regard to judgment of snow based upon the ratio Db/Da and judgment of snow based upon the amount Dc of diffuse reflected light, the condition of snow differs only slightly (and there are times when the conditions are the same) and therefore snow may be judged based upon the ratio Db/Da.

New snow and snow a part of which remains white even after being traveled upon by passing bodies (vehicles, passersby, etc.) reflects light diffusely. Since the amount of diffuse reflected light from snow is extremely large in comparison with other road surface conditions, snow and other road surface conditions can be judged based upon the amount Dc of diffuse reflected light. A threshold value for making this judgment is set to a level between the amount of diffuse reflected light at the time of snow and the amount of diffuse reflected light at the time of other road surface conditions.

Snow is determined in a case where the road surface temperature De is "low" and the amount Dc of diffuse reflected light is greater than the threshold value (this amount is referred to as "large"). It goes without saying that the threshold value of road surface temperature when freezing is determined and the threshold value of road surface temperature when snow is determined are made different from each other.

Snow determined based upon the amount Dc of diffuse reflected light is snow all or part of the surface of which is white. By contrast, snow determined based upon the ratio Db/Da also includes snow which causes a fluctuation in the amount of diffuse reflected light at a period greater than that for gravel. This snow is not only white snow but also snow darkened by being traveled on.

A discrimination algorithm for a case where the road surface temperature De is "high" is the same as that shown in FIG. 13.

It goes without saying that only part of the discrimination algorithm shown in FIG. 14 can be used so as to identify or judge only one, two or more types of road surface conditions from among freezing, snow, gravel, dry asphalt and wet asphalt.

(7) Road-surface discrimination algorithm (fourth aspect thereof)

Figure 15:
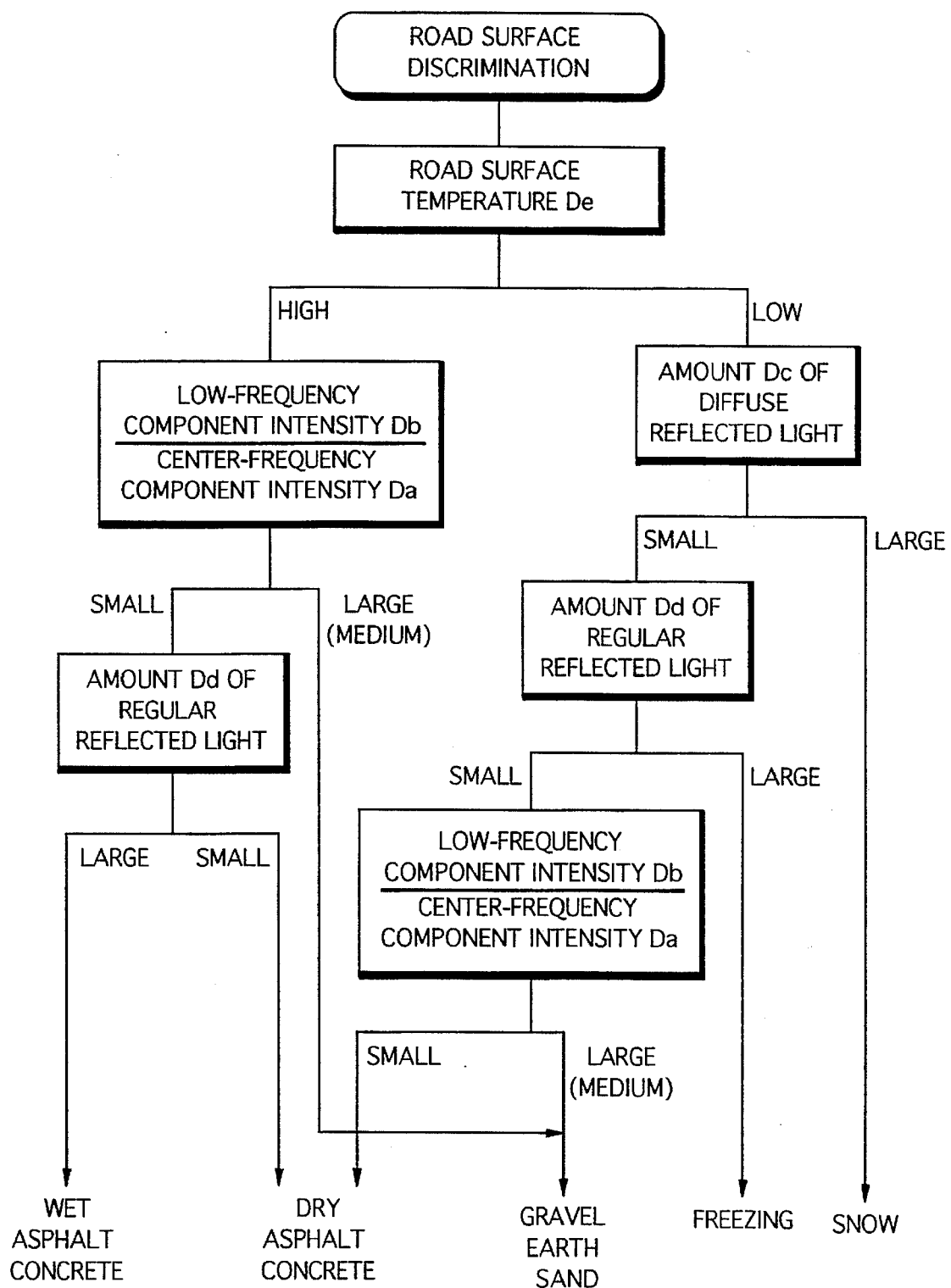
FIG. 15 is a flowchart illustrating a road-surface judgment algorithm (a fourth aspect thereof)

A road-surface judgment algorithm shown in FIG. 15 is similar to that shown in FIG. 14. In FIG. 15, gravel and asphalt are distinguished from each other based upon the ratio Db/Da. The fact that snow is not judged based upon the ratio Db/Da is different from the algorithm shown in FIG. 14. The algorithm of FIG. 15 may be considered to be a variation of the algorithm of FIG. 14.

Figure 16:
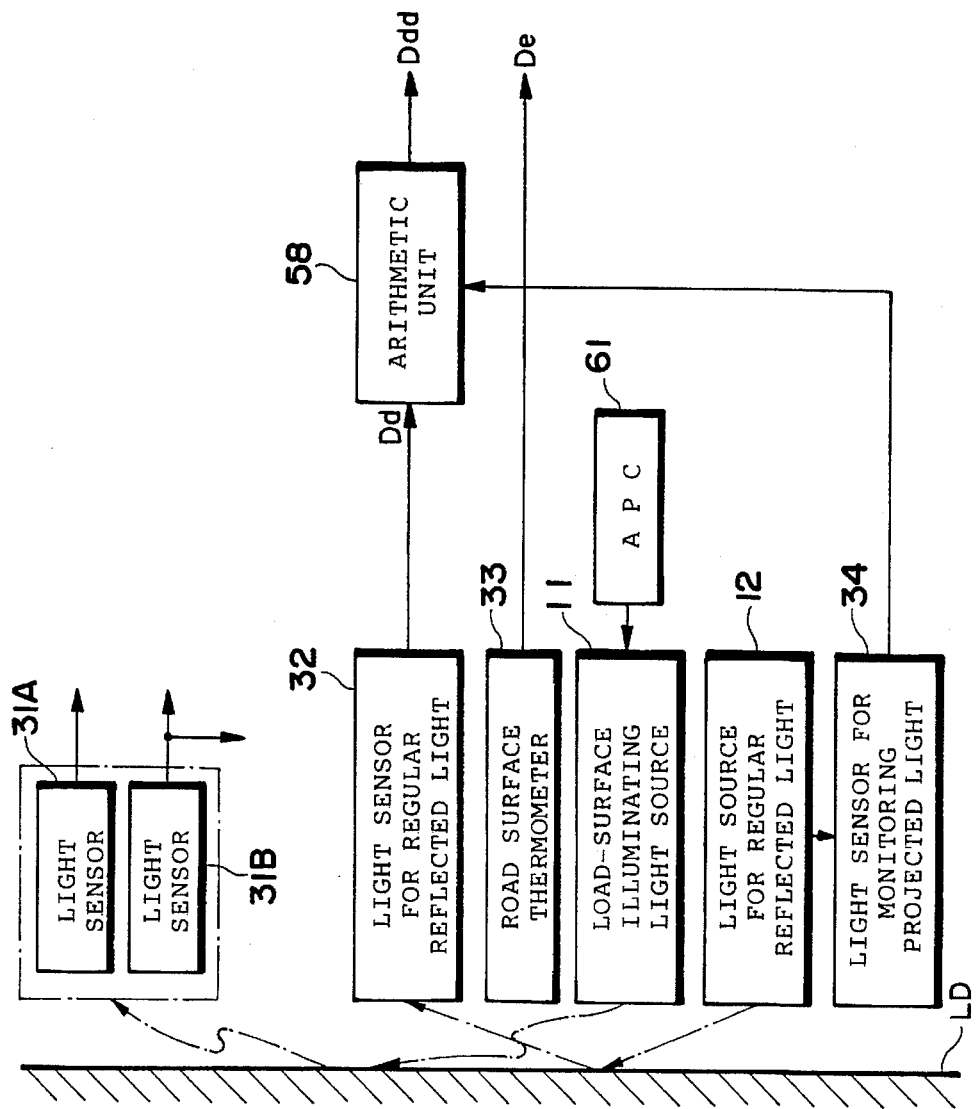
FIG. 16 is a block diagram illustrating the electrical configuration (a second aspect thereof) of the road surface discriminator.

(8) Electrical configuration (second aspect thereof) of road surface discriminator FIG. 16 illustrates an example of a signal processing circuit to utilize the output signal of the light sensor 34 (see the optical system of FIG. 1) for monitoring the amount of projected light from the light source 12, which is provided in the proximity of the light source 12 for regular reflected light.

The amount Dd of regular reflected light represented by the output signal from the light sensor 32 for regular reflected light is divided in the arithmetic circuit 58 by the value represented by the output signal of the light sensor 34. The result Ddd of division is applied to the discriminating circuit 60 in place of the amount Dd of regular reflected light. The value Ddd is used instead of Dd in the road-surface discrimination algorithm mentioned above.

Thus, even if the light projected from the light source 12 fluctuates (which fluctuation arises from a change in temperature or change with time), the amount of fluctuation is corrected for by the output of the light sensor 34 and, as a result, accurate discrimination of road surface can be carried out.

In FIG. 16, the light source 12 for regular reflected light is not controlled by an APC circuit. However, an arrangement may be adopted in which the light source is controlled by an APC circuit.

An arrangement may be adopted in which the amount of projected light from the road-surface illuminating light source 11 is sensed in the same manner and the output signal of the LPF 57 (which output represents the amount Dc of diffuse reflected light) is corrected based upon the sensed amount of light.

The arithmetic circuit 58 is not limited to a dividing circuit but may be a subtracting circuit.

Other components (portions deleted from the drawing) of this processing circuit are the same as those shown in FIG. 8.

Figure 17:
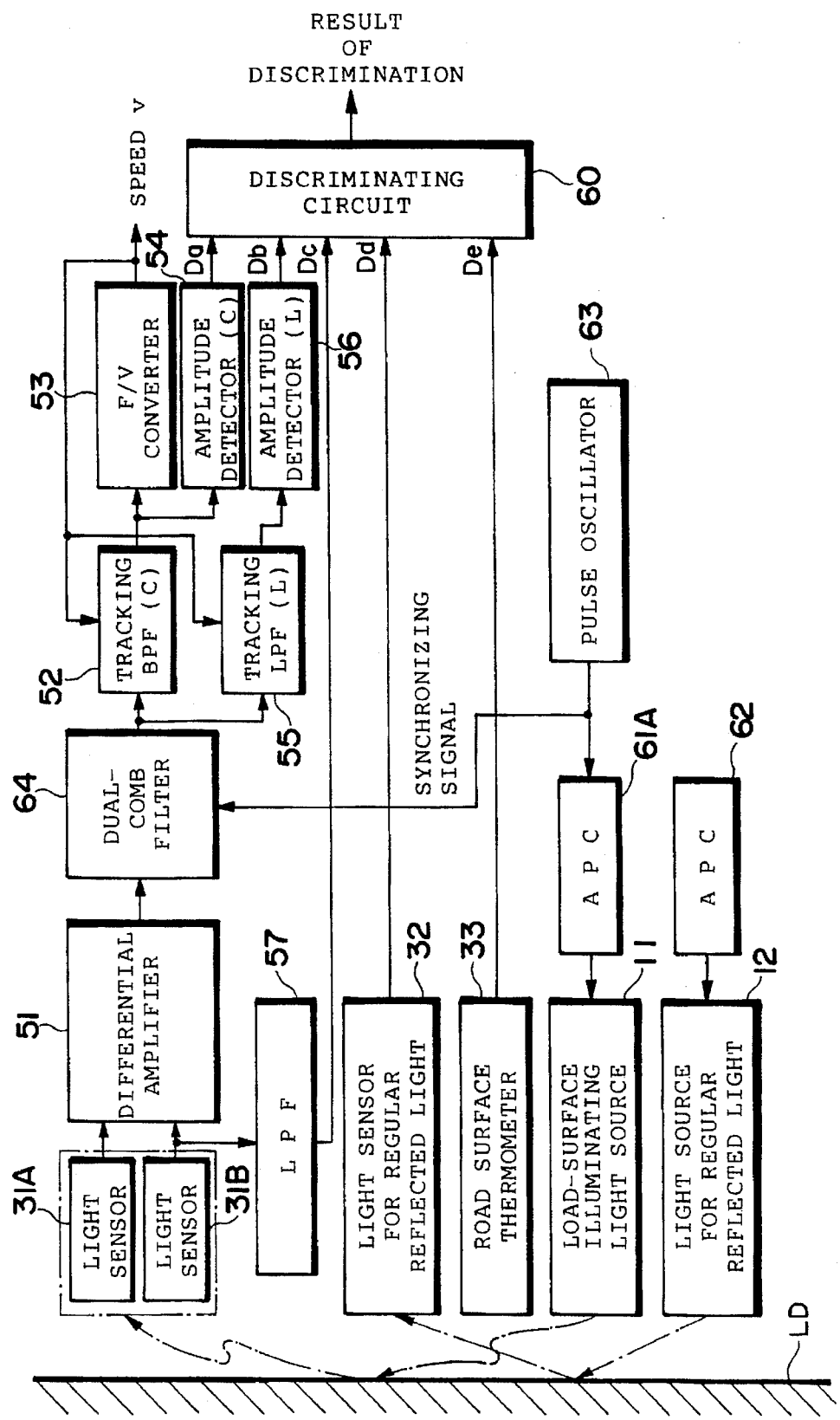
FIG. 17 is a block diagram illustrating the electrical configuration (a third aspect thereof) of the road surface discriminator.

(9) Electrical configuration (third aspect thereof) of road surface discriminator FIG. 17 illustrates an example of another arrangement of a signal processing circuit so devised as to eliminate the influence of extraneous light. This is applied to the optical system illustrated in FIGS. 1 through 3.

A pulse oscillator circuit 63 generates a pulse signal having a constant frequency (described later) and applies the signal to an APC circuit 61A and dualcomb filter 64. The APC circuit 61A drives the road-surface illuminating light source 11 in sync with the applied pulse signal. Accordingly, the light source 11 projects pulsed light toward the road surface at a constant period.

The light sensors 31A, 31B receive the pulsed diffuse reflected light so that the output signal of the differential amplifier circuit 51 also becomes a pulsed signal. This signal can be thought of as being one obtained by pulse-width modulating the diffuse reflected light. An example of the output signal from the differential amplifier circuit 51 is illustrated in FIG. 19.

The output signal of the differential amplifier circuit 51 possesses a waveform which is the result of superposition of extraneous light upon the pulsed signal (the peak value whereof represents the amount of diffuse reflected light) synchronized to the oscillation pulses from the pulse oscillator circuit 63. The dualcomb filter 64 eliminates the extraneous light and smoothes the pulsed signal.

Figure 19:
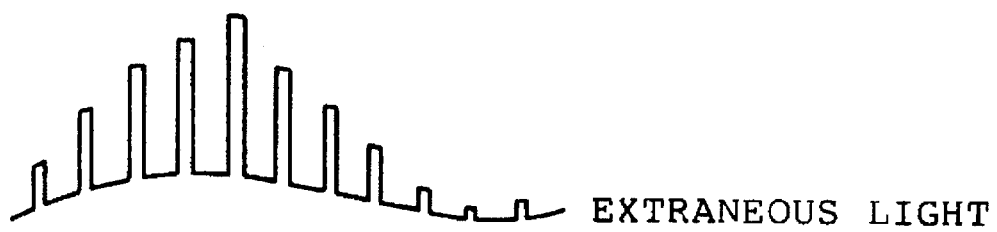
FIG. 19 is a waveform diagram of an input signal and FIG. 20 is an enlarged view of a portion thereof.
Figure 20:
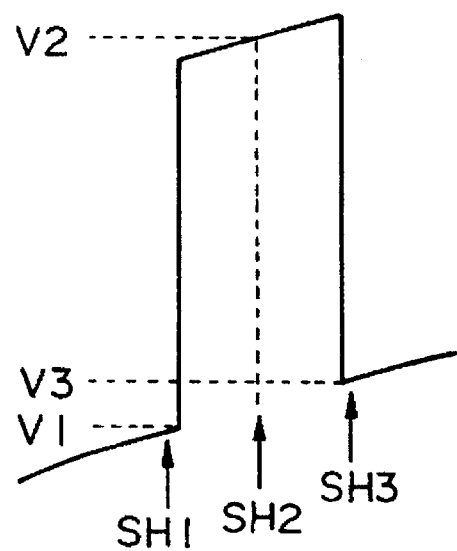

FIG. 20 illustrates one pulse extracted from FIG. 19 and shown in enlarged form. The level of the signal is sampled and held at a timing SH1 immediately preceding the leading edge of the pulse, a timing SH3 immediately following the trailing edge of the pulse and at a time SH2 intermediate the leading and trailing edges. Let these levels that are sampled and held be referred to as V1, V2 and V3, respectively. The level of one pulse is calculated in accordance with the next formula by using these levels and the level is maintained until the next pulse. The influence of the extraneous light is thus eliminated.

$$2V2-(V1+V3) \qquad \text{Eq. (5)}$$

Figure 18:
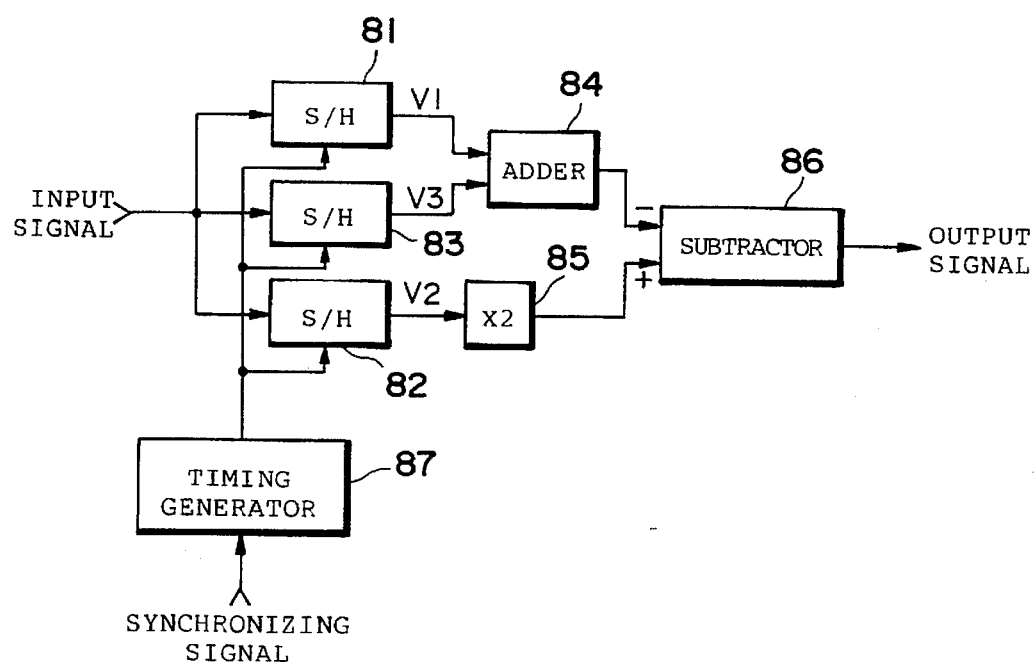
FIG. 18 is a block diagram showing an example of the construction of a dualcomb filter.

The dualcomb filter 64 performs the above-mentioned sample-and-hold operation, arithmetic operation and output maintaining operation. A specific example of the construction thereof is illustrated in FIG. 18.

The pulsed signal from the pulse oscillator circuit 63 is applied to a timing generator circuit 87 as a synchronizing signal. The timing generator circuit 87 generates timing signals respectively representing the aforesaid timings SH1, SH2, SH3 and applies the timing signals to sample-and-hold (S/H) circuits 81, 82, 83. The output signal of the differential amplifier circuit 51 enters the S/H circuits 81, 82, 83 and is sampled and held at each of the timings.

Outputs V1, V3 of the S/H circuits 81, 83 are added by an adder circuit 84, and the output V2 of the S/H circuit 82 is doubled by a doubling circuit 85. The output of the adder circuit 84 is subtracted from the output of the doubling circuit 85 in a subtractor circuit 86 and the result of subtraction is delivered as an output signal. This output signal is held until the calculation regarding the next pulse is finished. The output signal of the dualcomb filter 64 is applied to the tracking BPF 52 and the tracking LPF 55.

An arrangement may be adopted in which the pulse oscillator circuit 63 is provided with the timing generating circuit 87 and a sample-and-hold timing signal from the pulse oscillator circuit 63 is applied to the dualcomb filter 64.

In the operation described above, delay time and light propagation time in the light source 11 and light sensors 31A, 31B can be ignored. The sample-and-hold timing is not limited to that set forth in the example described above. It will suffice if sample-and-hold is performed at least at two times, namely at the moment the pulse peaks and at a moment before the pulse rises or a moment after the pulse decays.

The pulse signal generated by the pulse oscillator circuit 63 has a frequency $f_p$ which is required to be no less than twice the maximum frequency of the input signal to the dualcomb filter 64 (the output signal of the differential amplifier circuit 51). That is, the following is required to hold:

$$f_p > 2 \cdot \mu \cdot v_{max} \qquad \text{Eq. (6)}$$

By way of example, we have $f_p > 11.1$ (KHz) if the following hold: $\mu = 0.2$ (mm$^{-1}$) (center spatial frequency) and $v_{max} = 100$ (Km/h) $= 2.78 \times 10^4$ (mm/s) (maximum ground speed).

Other components in FIG. 17 are the same as those shown in FIG. 8.

Figure 21:
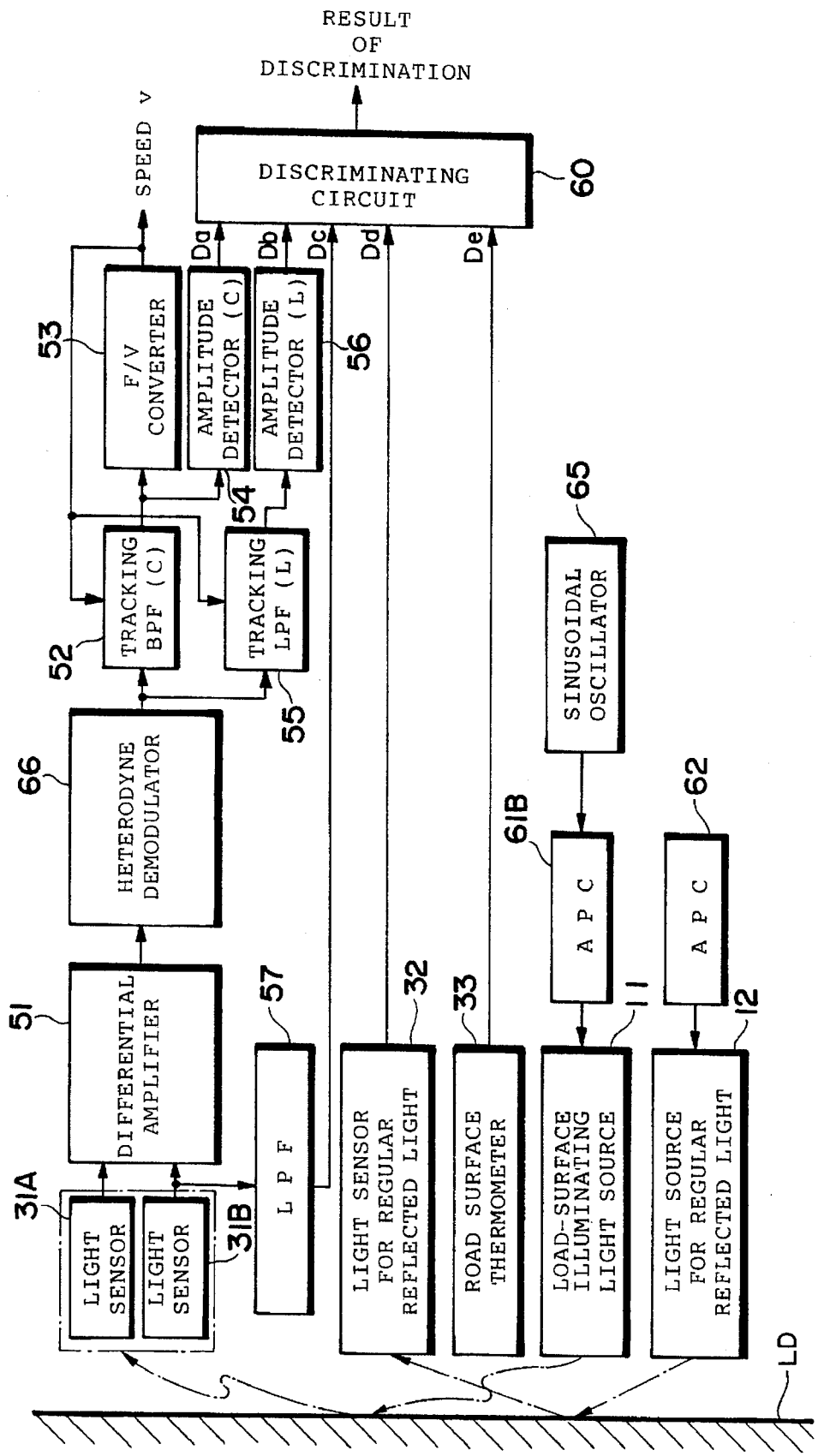
FIG. 21 is a block diagram illustrating the electrical configuration (a fourth aspect thereof) of the road surface discriminator.

(10) Electrical configuration (fourth aspect thereof) of road surface discriminator FIG. 21 shows yet another example of the signal processing circuit. If this circuit is compared with the signal processing circuit shown in FIG. 17, it is seen that a sinusoidal oscillator circuit 65 is used instead of the pulse oscillator circuit 63 and that the amount of projected light from the light source 11 is sinusoidally modulated by the APC circuit 61B. A heterodyne demodulator (detector) circuit 66 is used instead of the dualcomb filter 64 so that the output signal of the differential amplifier circuit 51 is demodulated and then applied to the tracking BPF 52 and the tracking LPF 55. Extraneous light can be eliminated and the S/N ratio improved by this arrangement as well. Other components are the same as those shown in FIGS. 8 and 17.

Figure 22:
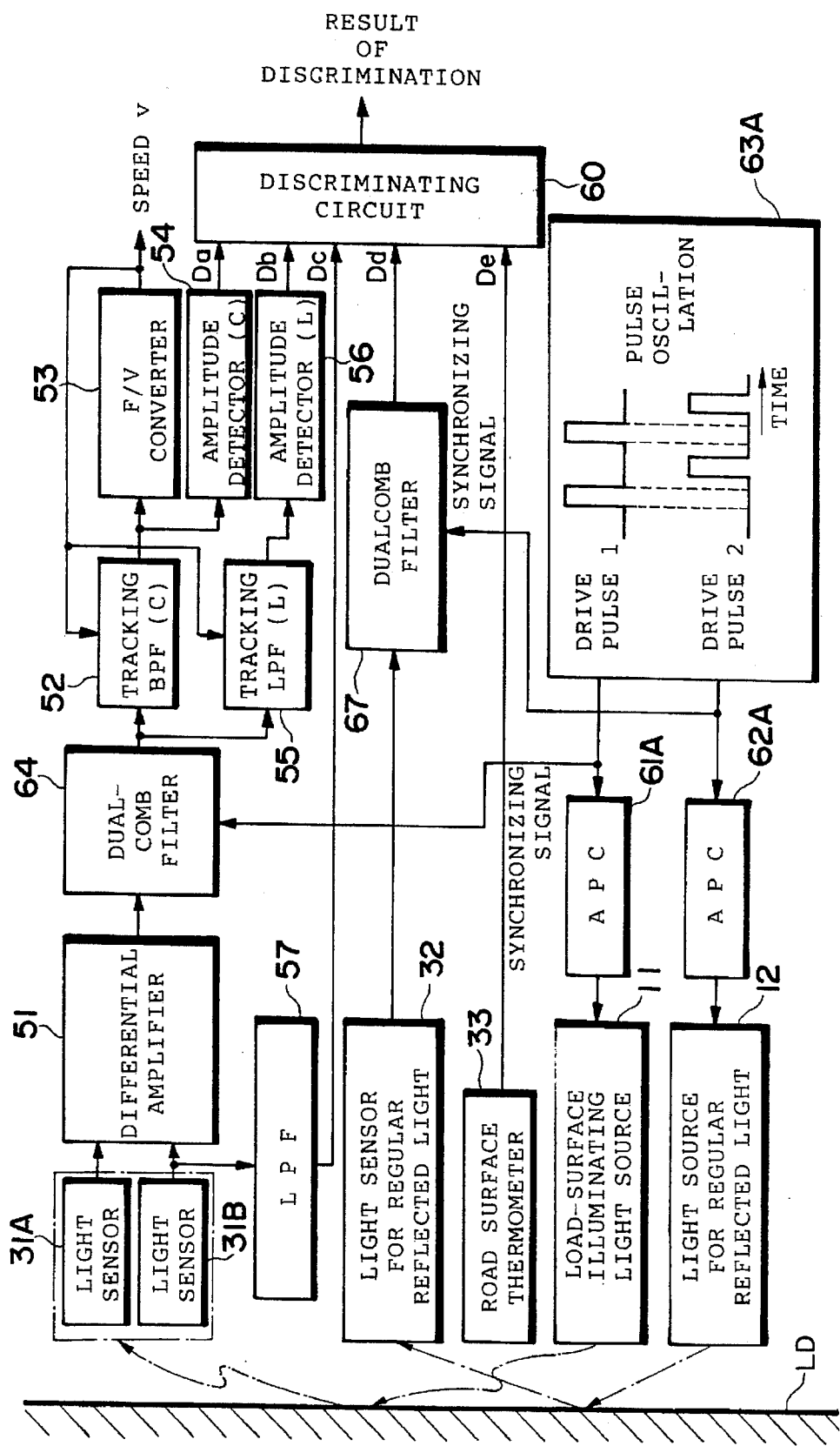
FIG. 22 is a block diagram illustrating the electrical configuration (a fifth aspect thereof) of the road surface discriminator.

(11) Electrical configuration (fifth aspect thereof) of road surface discriminator FIG. 22 shows yet a further example of the signal processing circuit.

Both the light source 11 for illuminating the road surface and the light source 12 for regular reflected light are driven by pulses. The pulse oscillator circuit 63A generates two types of drives pulses, namely a drive pulse 1 and a drive pulse 2, of different phases. The light sources 11 and 12 are driven by pulses at different timings by APC circuits 61A and 62A on the basis of the drive pulses 1 and 2, respectively. A dualcomb filter 67 is provided on the output side of the sensor 32 for regular reflected light in addition to the dualcomb filter 64 connected to the output side of the differential amplifier circuit 51. The output signal of the dualcomb filter 67 is applied to the discriminating circuit 60 as a signal representing the amount Dd of regular reflected light.

Synchronizing signals synchronized to the drive pulses 1 and 2 from the pulse oscillator circuit 36A are applied to the dualcomb filters 64 and 67, respectively.

By virtue of the arrangement described above, diffuse reflected light and regular reflected light can be separated from each other and detected reliably even if the wavelengths of the projected light from the light sources 11 and 12 having the same or nearly the same value. The effects of extraneous light can be eliminated as well.

Figure 23:
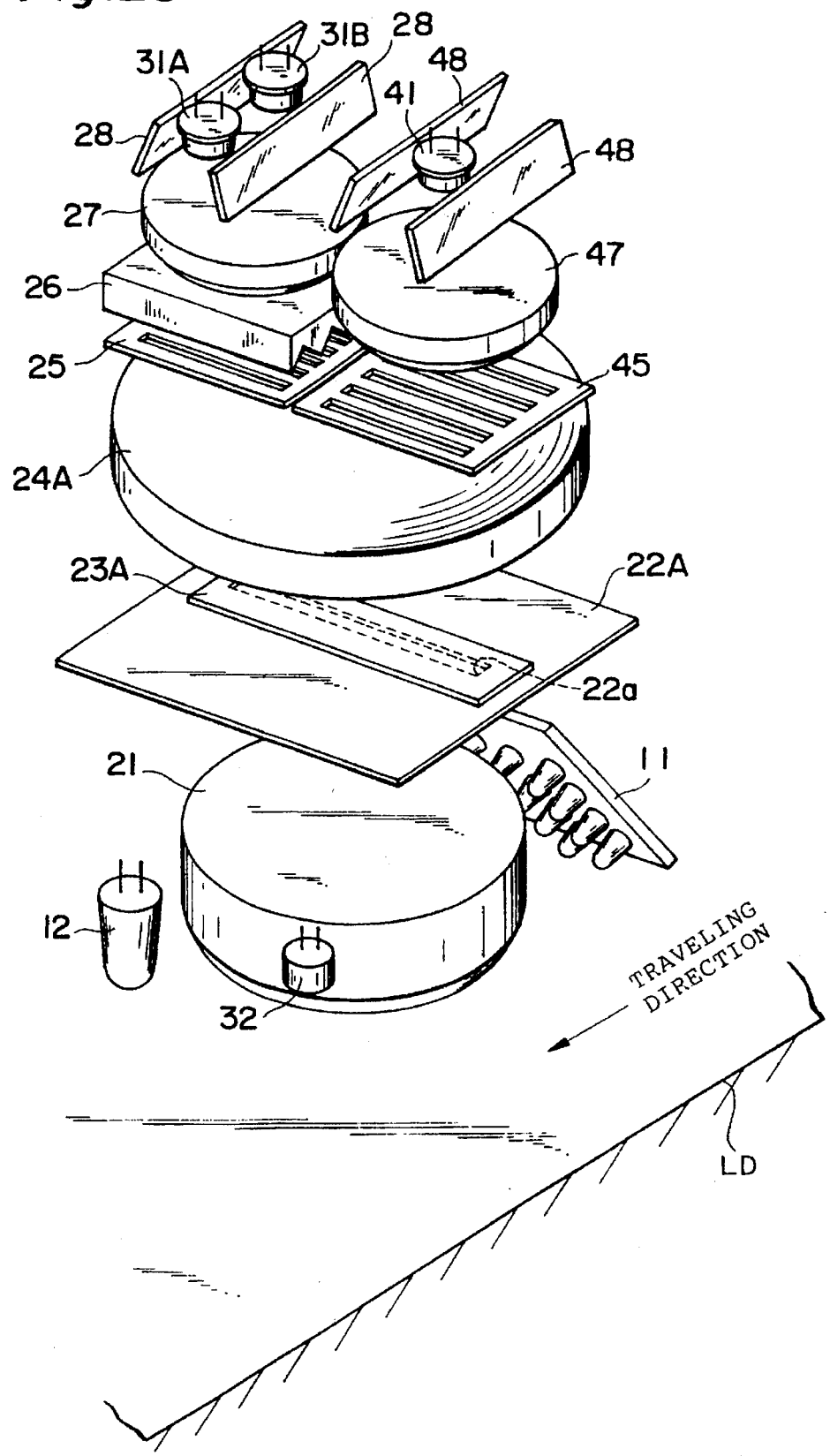
FIG. 23 is a perspective view illustrating the optical structure (a second aspect thereof) of the road surface discriminator.
Figure 24:
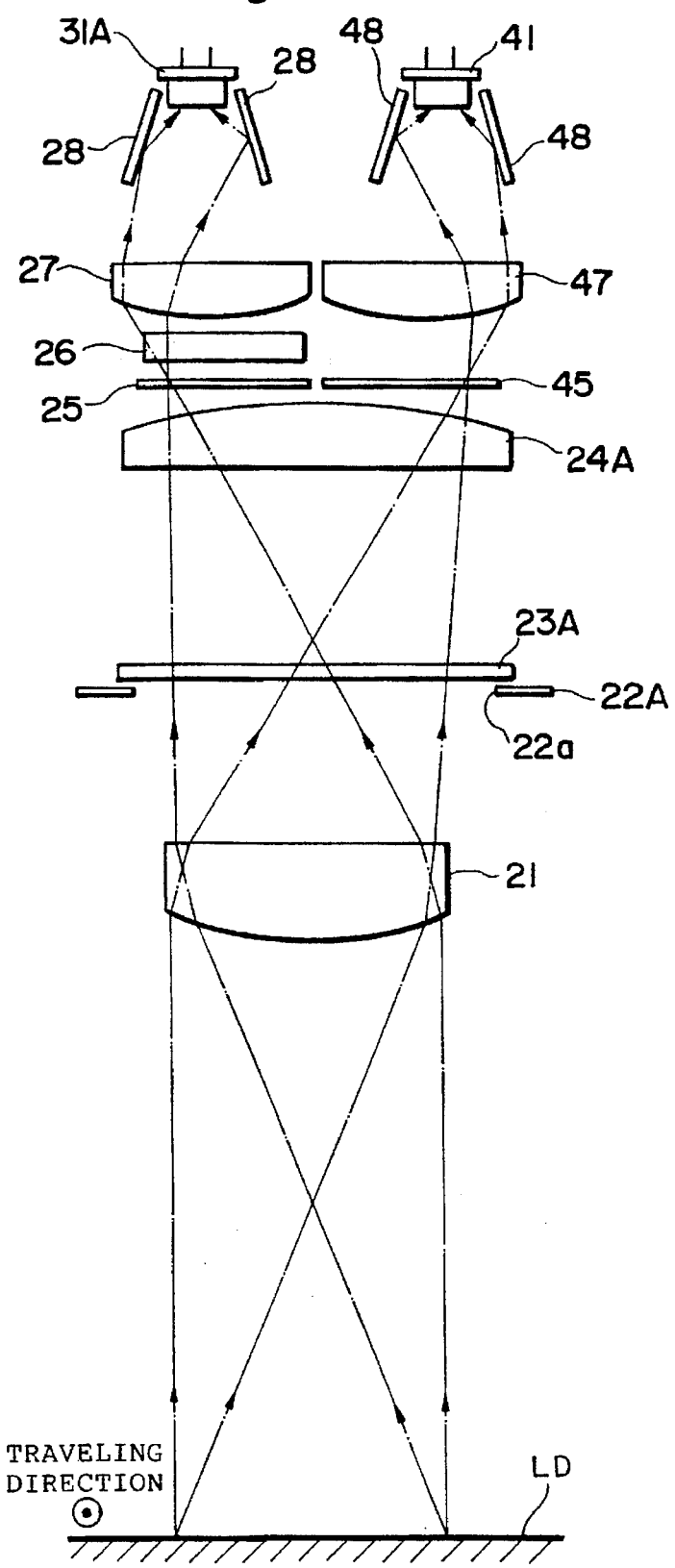
FIG. 24 is a front view thereof.

(12) Optical structure (second aspect thereof) and electrical configuration (sixth aspect thereof) of road surface discriminator FIGS. 23 and 24 illustrate another example of the optical structure of the road surface discriminator. Components identical with those shown in FIGS. 1 through 3 are designated by like reference characters and a description thereof is deleted. Further, a slit plate is indicated by characters 22A, an optical filter by characters 23A and a collimating lens by characters 24A. The light sources 11, 12 and the light sensor 32 are not shown in FIG. 24.

Figure 25:
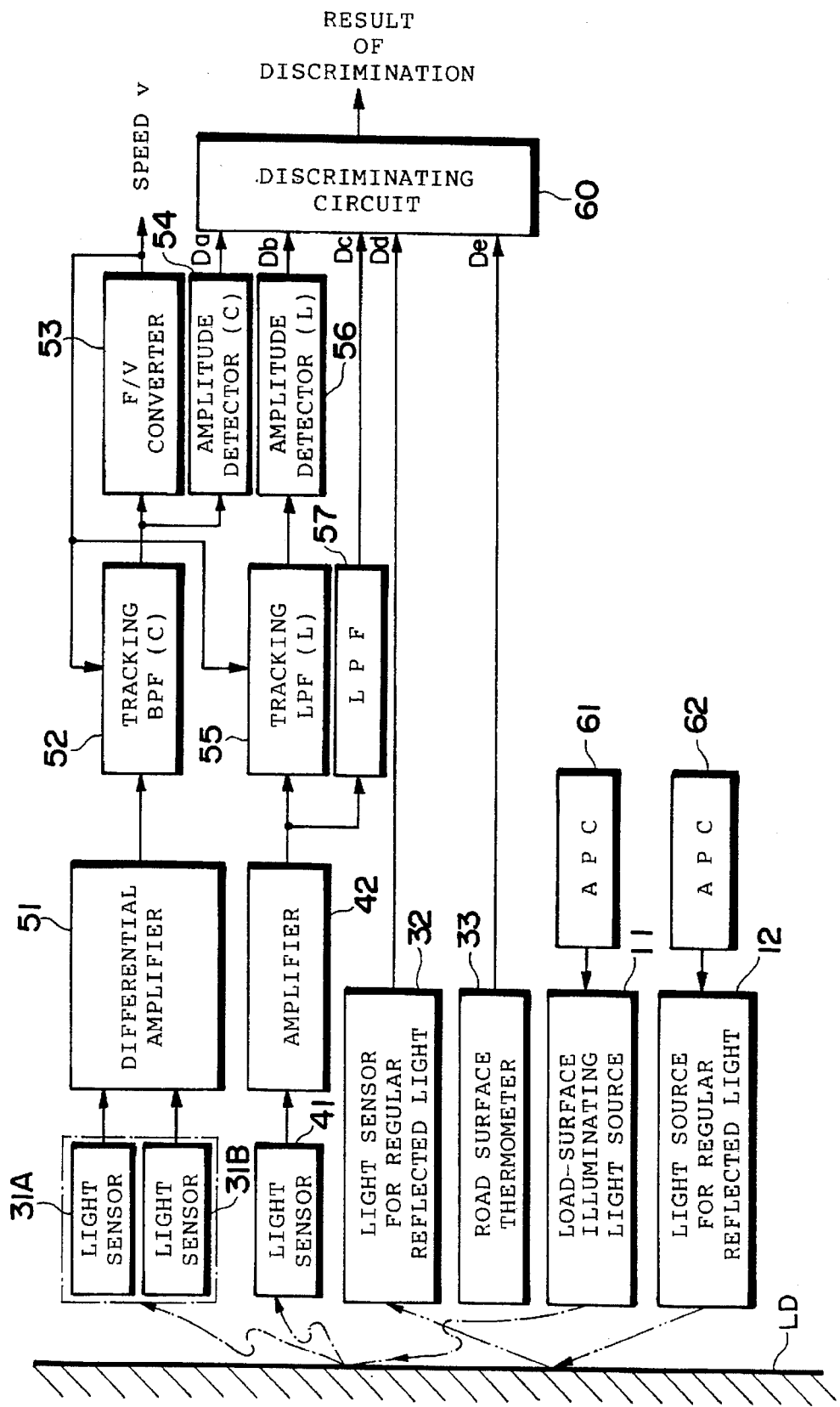
FIG. 25 is a block diagram illustrating the electrical configuration (a sixth aspect thereof) of the road surface discriminator.

FIG. 25 illustrates an electrical configuration (signal processing circuit) suited to the optical structure shown in FIGS. 23 and 24. Components in this Figure identical with those shown in FIG. 8 are also designated by like reference characters and a redundant explanation thereof is omitted.

The fact that the center-frequency component intensity Da is obtained based upon a differential signal between the output signals of the light sensors 31A and 31B is the same as in the arrangement shown in FIG. 8. Let the light-receiving optical system which includes the light sensors 31A and 31B (which system contains the grating plate 25, the prism array 26, the condenser lens 27 and the mirror 28) be referred to as a first light-receiving optical system.

One other, namely a second, light-receiving optical system is provided to obtain signals respectively representing the low-frequency component intensity Db and the amount Dc of diffuse reflected light. This second light-receiving optical system is constituted by a grating plate 45, a condenser lens 47, a light sensor 41 and a mirror 48.

The light source 11 for illuminating the road surface, the light-receiving lens 21, the slit plate 22A, the optical filter 23A and the collimating lens 24A are shared by the first and second light-receiving optical systems.

Accordingly, diffuse reflected light from the road surface LD is incident upon not only the first light-receiving optical system but also the second light-receiving optical system and is received by the light sensor 41. The light-reception signal from the light sensor 41 is applied to the tracking LPF 55 and the LPF 57 after being amplified by an amplifier circuit 42. A signal representing the low-frequency component intensity Db based upon the output signal of the tracking LPF 55 and a signal representing the amount Dc of diffuse reflected light from the LPF 57 are obtained.

As mentioned above, the center-frequency component is amplified approximately by a factor of two by taking the difference between the output signals of the two light sensors 31A and 31B. However, there are occasions where some cancellation of the low frequency components occurs by taking the aforementioned difference. The other light sensor 41 is provided to assure the low-frequency components of a higher level.

If necessary, the second light-receiving optical system may be provided with a spatial filter having a center spatial frequency corresponding to the low-frequency component to be extracted. In such case it is desired that the second light-receiving optical system be provided with two light sensors and that the output signals of these light sensors be applied to a differential amplifier circuit.

All of the algorithms described earlier are used as the road-surface discrimination algorithms. Further, the approaches taken in the modifications shown in FIGS. 16, 17, 21 and 22 are applicable to the circuitry of FIG. 25.

Figure 26:
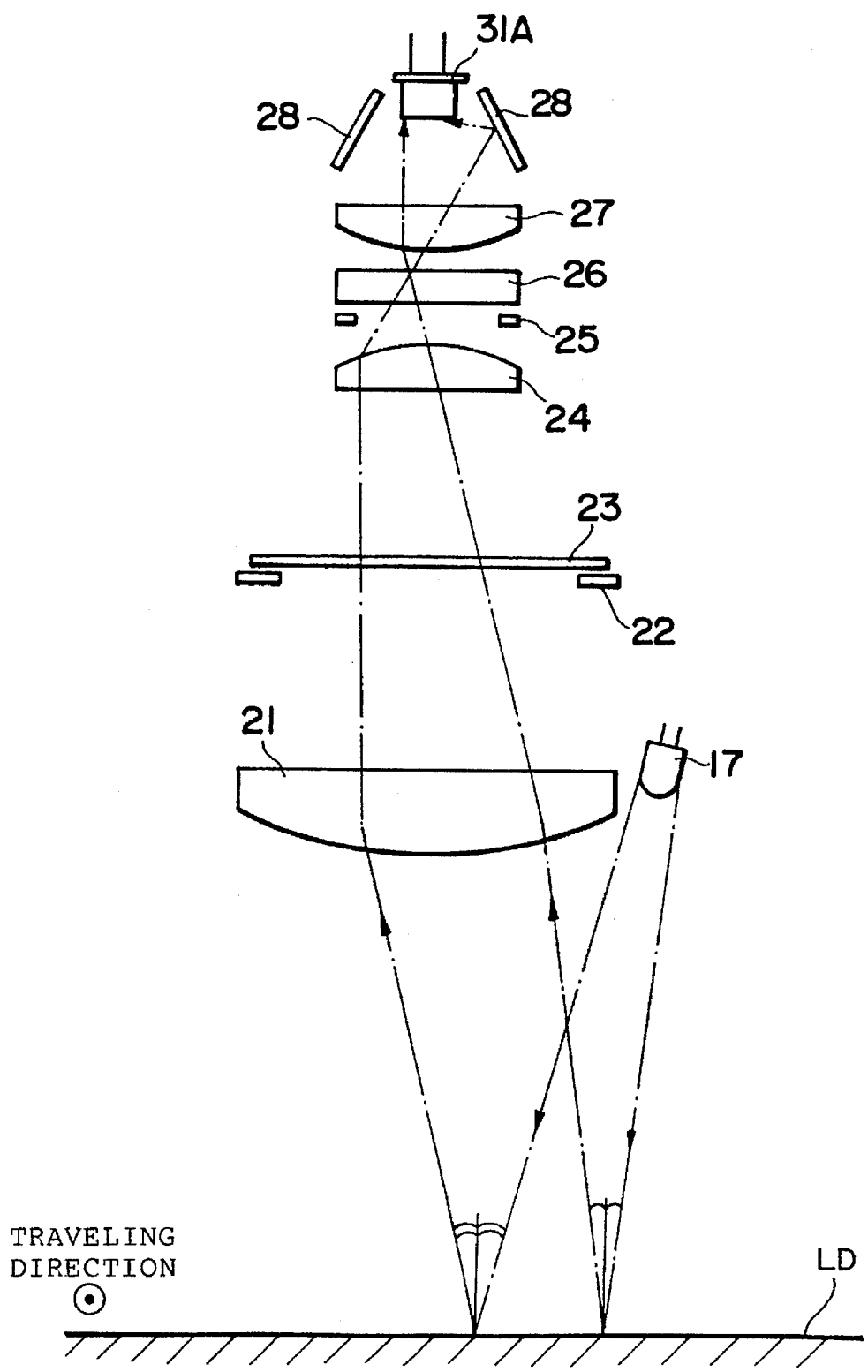
FIG. 26 is a front view illustrating the optical structure (a third aspect thereof) of the road surface discriminator.

(13) Optical structure (third aspect thereof), electrical configuration (seventh aspect thereof) and road-surface discrimination algorithm (fifth, sixth and seventh aspects thereof) of road surface discriminator FIG. 26 illustrates a further example of the optical structure of the road surface discriminator. The optical structure is basically the same as that shown in FIGS. 1 and 2. The differences between two are as follows:

The light source 12 for regular reflected light, the light sensor 32 for regular reflected light and the sensor 34 for monitoring the amount of projected light shown in FIGS. 1 and 2 (and in FIG. 3) are deleted. Instead, a light source 17 for regular reflected light is provided.

The light source 17 for regular reflected light is provided and placed in such a manner that, of the light projected upon the road surface LD from the light source 17, the regular reflected light from the road surface LD will impinge upon the light sensors 31A, 31B through the light-receiving lens 21, slit plate 22, optical filter 23, collimating lens 24, grating plate (slit array) 25, prism array 26 and condenser lens 27. Since the regular reflected light is large in quantity if the road surface is wet or frozen, the light source 17 need not produce as much light as the light source 11 (it will suffice if the number of light-emitting diodes constructing the light source is small).

Figure 27:
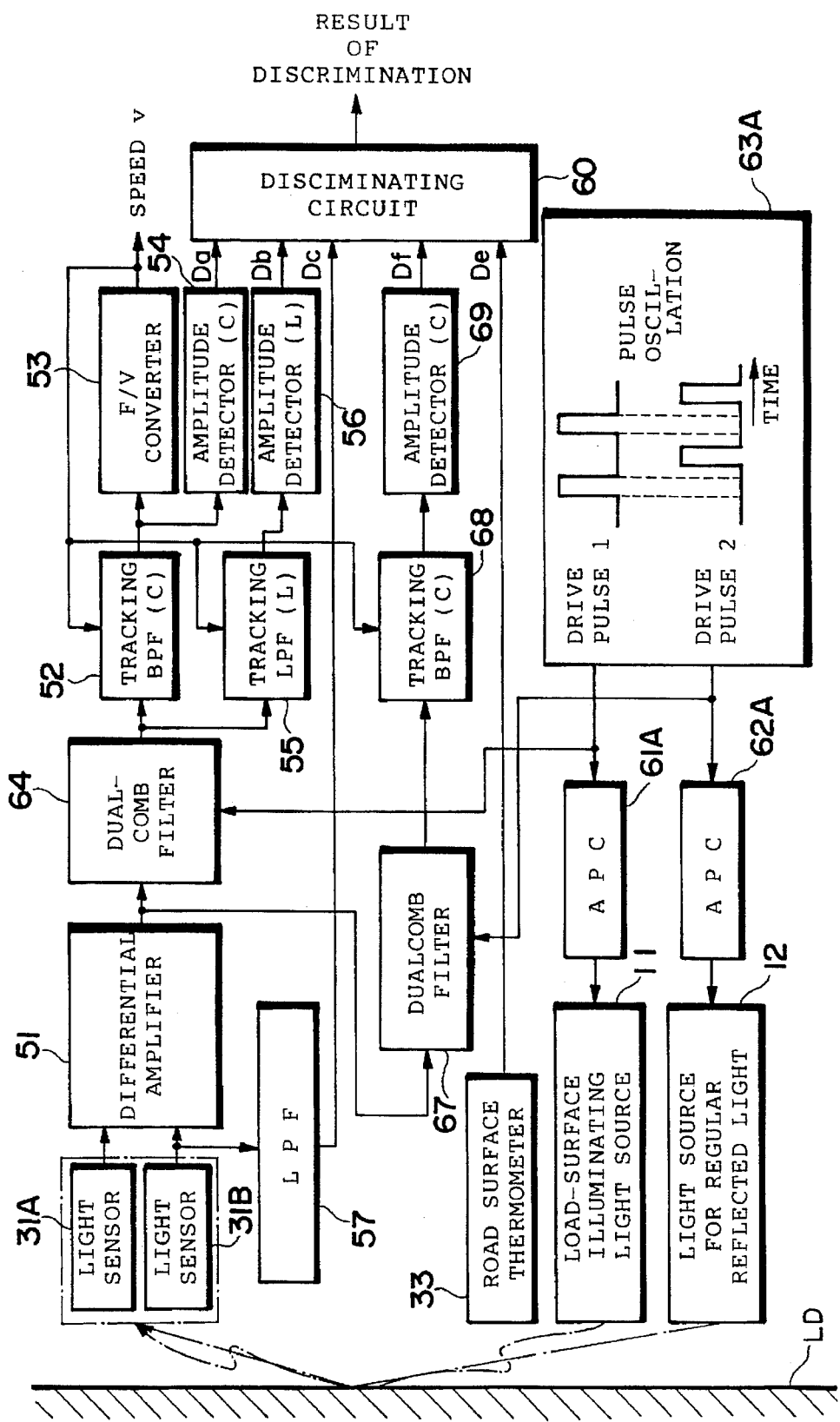
FIG. 27 is a block diagram illustrating the electrical configuration (a seventh aspect thereof) of the road surface discriminator.

FIG. 27 illustrates a signal processing circuit suited to the optical system shown in FIG. 26. This circuit resembles the arrangement shown in FIG. 22 in that the light sources are driven by two types of pulses having different timings and the light-reception signal is separated by a dualcomb filter. Components in this Figure identical with those shown in FIG. 22 are designated by like reference characters and a redundant explanation thereof is omitted; only the differences will be described.

The light source 11 for illuminating the road surface and the light source 17 for regular reflected light are driven by pulses alternately by the APC circuits 61A, 62A based upon two types of drive pulses 1 and 2 having different timings.

Diffuse reflected light and regular reflected light from the road surface LD is sensed by the light sensors 31A, 31B and a differential output between the output signals of the two sensors 31A, 31B is obtained in the differential amplifier circuit 51. The output of the differential amplifier circuit 41 is applied to the two dualcomb filters 64, 67.

The dualcomb filter 64 operates in sync with pulses driving the light source 11 and extracts a signal based upon the diffuse reflected light. Signals respectively representing the center-frequency component intensity (diffuse reflected light) Da and the low-frequency component intensity (diffuse reflected light) Db are obtained based upon the output signal of the dualcomb filter 64.

The dualcomb filter 67 operates in sync with pulses driving the light source 17 and extracts a signal based upon the regular reflected light. The output signal of the filter 67 is applied to a tracking BPF 68. The tracking BPF 68 is the same as the tracking BPF 52 and receives feedback, namely the voltage signal representing the speed v. The output signal of the tracking BPF 68 is applied to an amplitude detector circuit 69. A signal representing the center-frequency component intensity (regular reflected light) Df is obtained from the amplitude detector circuit 69 and is applied to the discriminating circuit 60.

The light sources 11 and 17 can be modulated by signals having different frequencies and the outputs of the differential amplifier 51 can be demodulated by the modulation frequencies, whereby it is also possible to achieve separation into a signal based upon diffuse reflected light and a signal based upon regular reflected light.

Figure 28:
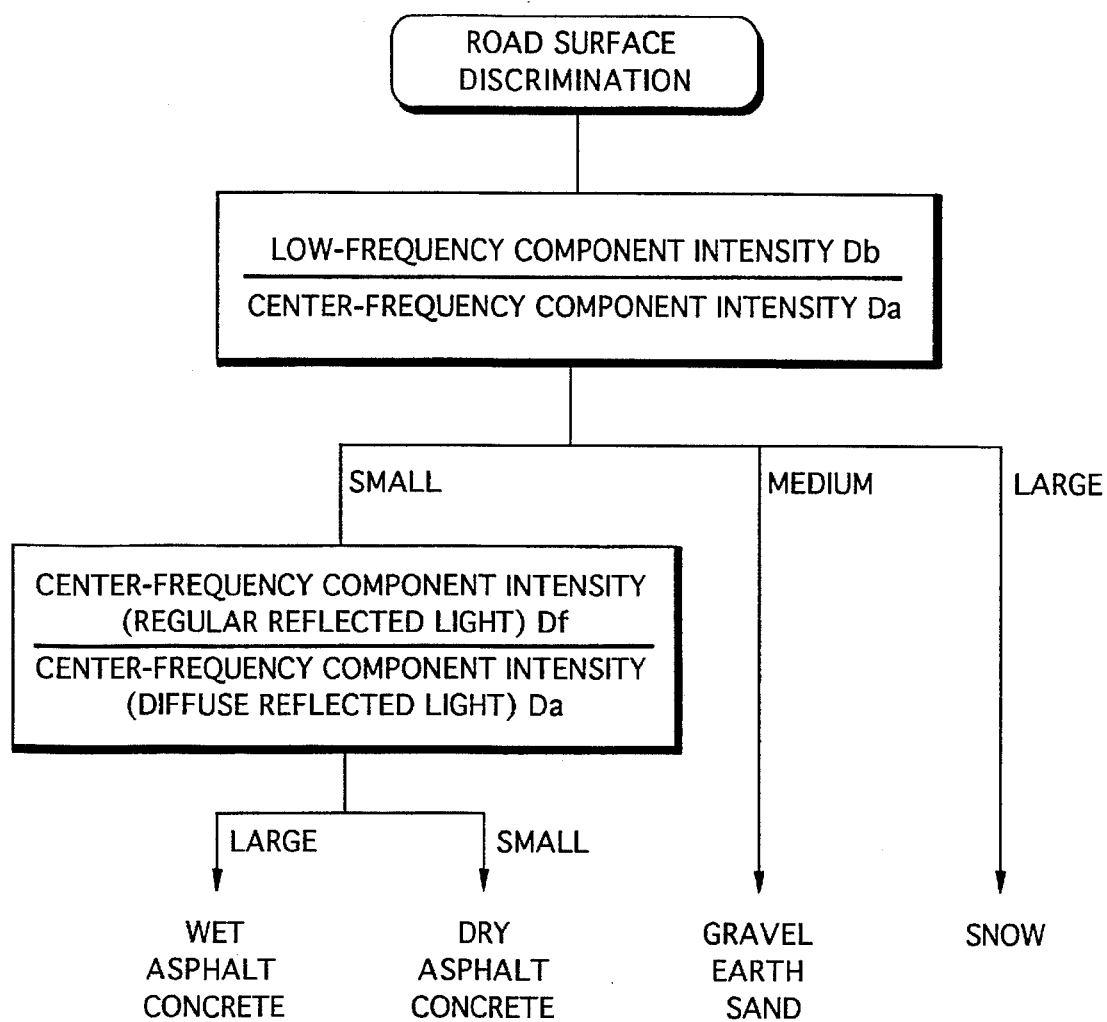
FIG. 28 is a flowchart illustrating a road-surface judgment algorithm (a fifth aspect thereof)
Figure 29:
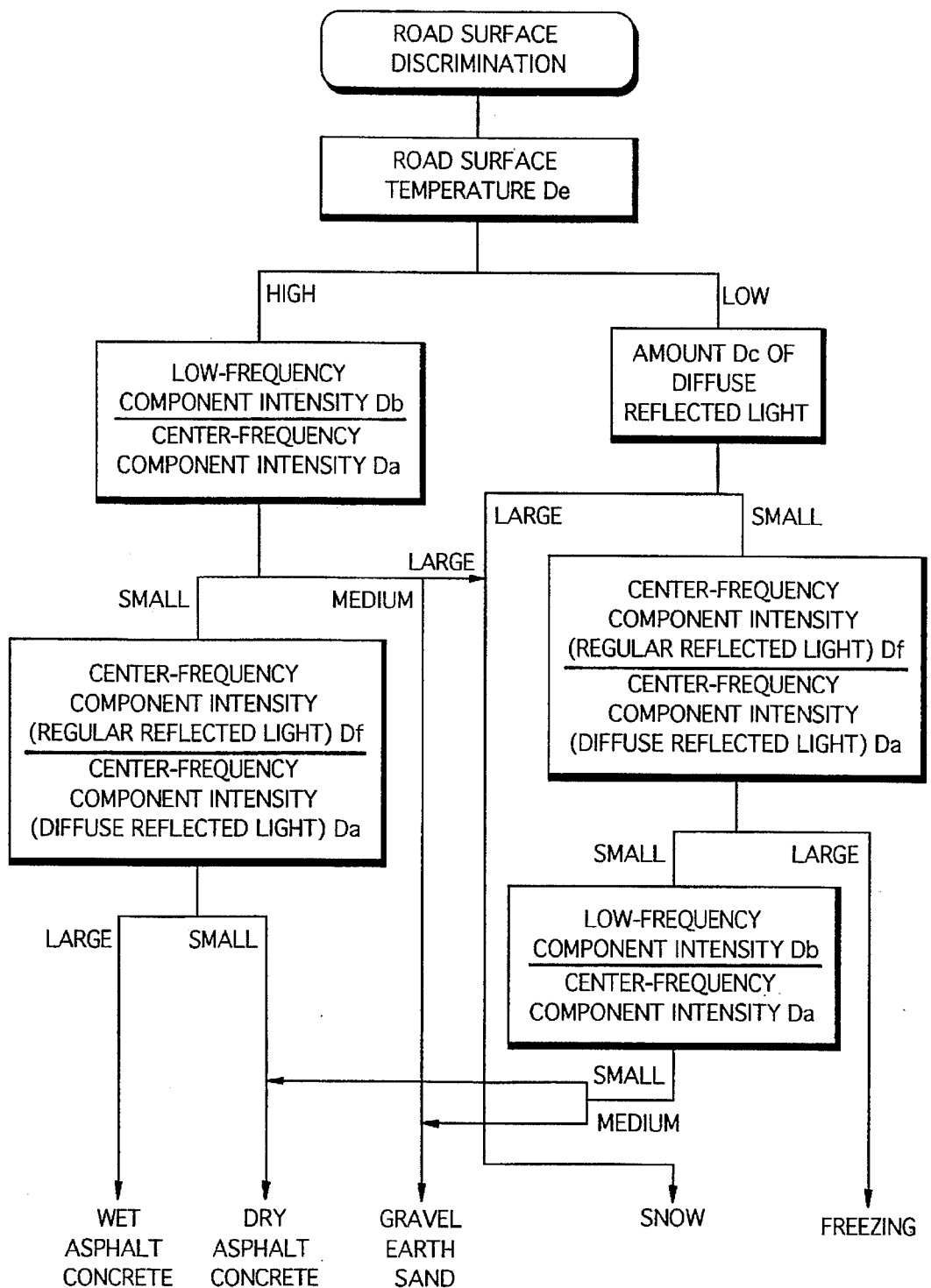
FIG. 29 is a flowchart illustrating a road-surface judgment algorithm (a sixth aspect thereof)
Figure 30:
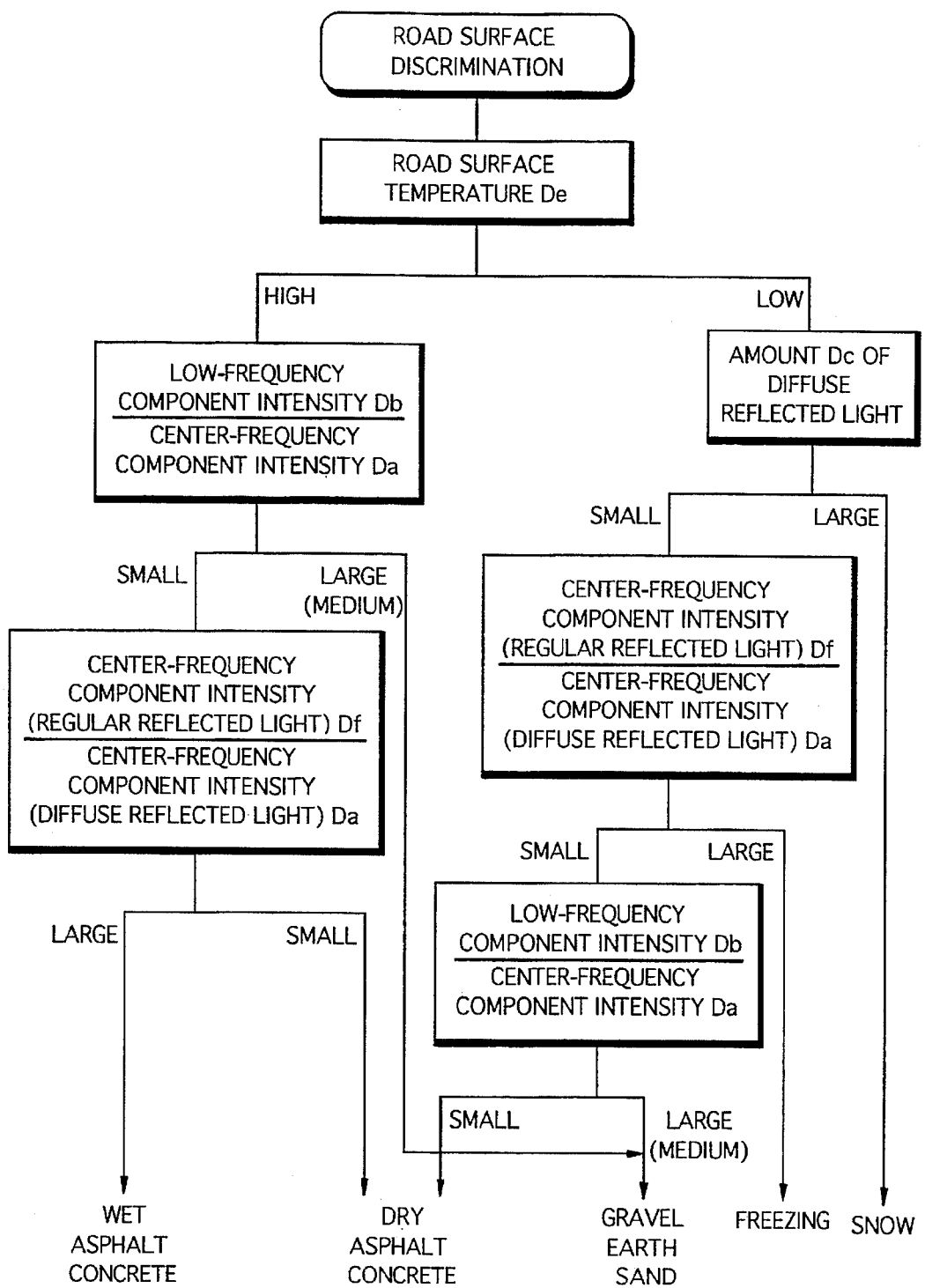
FIG. 30 is a flowchart illustrating a road-surface judgment algorithm (a seventh aspect thereof)

FIGS. 28, 29 and 30 illustrate road-surface discrimination algorithms (fifth, sixth and seventh aspects thereof), respectively. These algorithms basically are the same as those shown in FIGS. 13, 14 and 15. The single difference is as follows:

Specifically, the amount Dd of regular reflected light used in the algorithms of FIGS. 13 through 15 is replaced by the ratio Df/Da of the center-frequency component intensity (regular reflected light) Df to the center-frequency component intensity (diffuse reflected light) Da. Since the amount of regular reflected light becomes large under freezing or wet conditions, the ratio Df/Da becomes large under these conditions. Accordingly, a condition can be judged to be a freezing or wet condition by discriminating the ratio Df/Da using a suitable threshold value.

Figure 31:
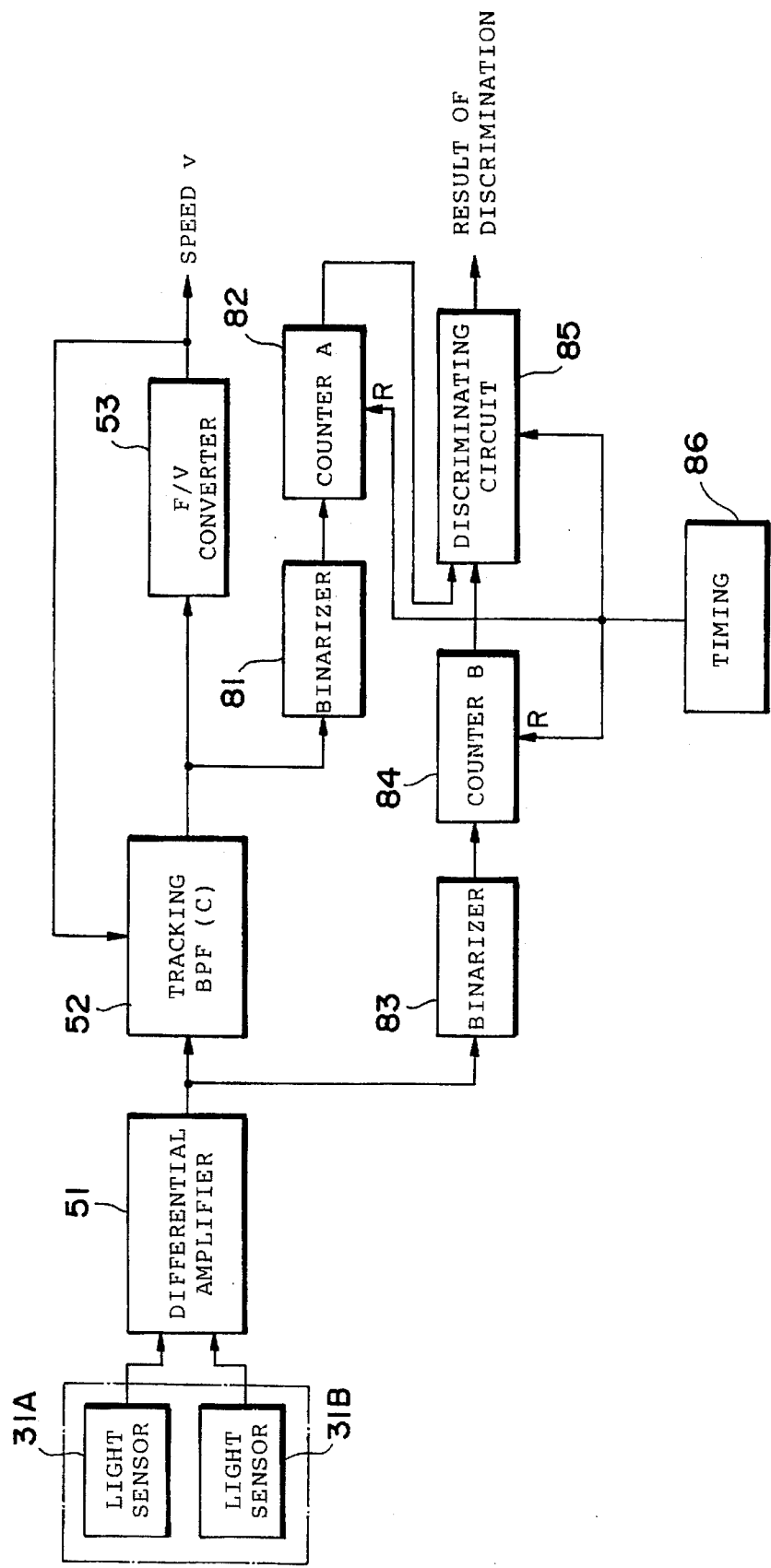
FIG. 31 is a block diagram illustrating the electrical configuration (an eighth aspect thereof) of the road surface discriminator.

(14) Electrical configuration (eighth, ninth, tenth, 11th and 12th aspects thereof) of road surface discriminator FIG. 31 illustrates an example (eight aspect) of a simplified processing circuit in the road surface discriminator. An example will be described in which a road surface condition is distinguished to be either snowy or gravel. Components in this Figure already described are designated by like reference characters and a redundant explanation thereof is omitted.

The output signal of the tracking BPF 52 contains a center-frequency component. This output signal is binarized in a binarizing circuit 81 using the zero level thereof as a threshold-value level, and the binarized signal enters a counter 82 (referred to as "counter A").

On the other hand, the output signal of the differential amplifier circuit 51 contains low-frequency components and not only a center-frequency component. As described with reference to FIG. 7, the levels of the low-frequency components change in dependence upon the road surface condition and are ranked as follows in order of decreasing level: snow, gravel and asphalt. This signal is binarized in a binarizing circuit 83 using the zero level thereof as a threshold-value level, and the binarized signal enters a counter 84 (referred to as "counter B").

Figure 33:
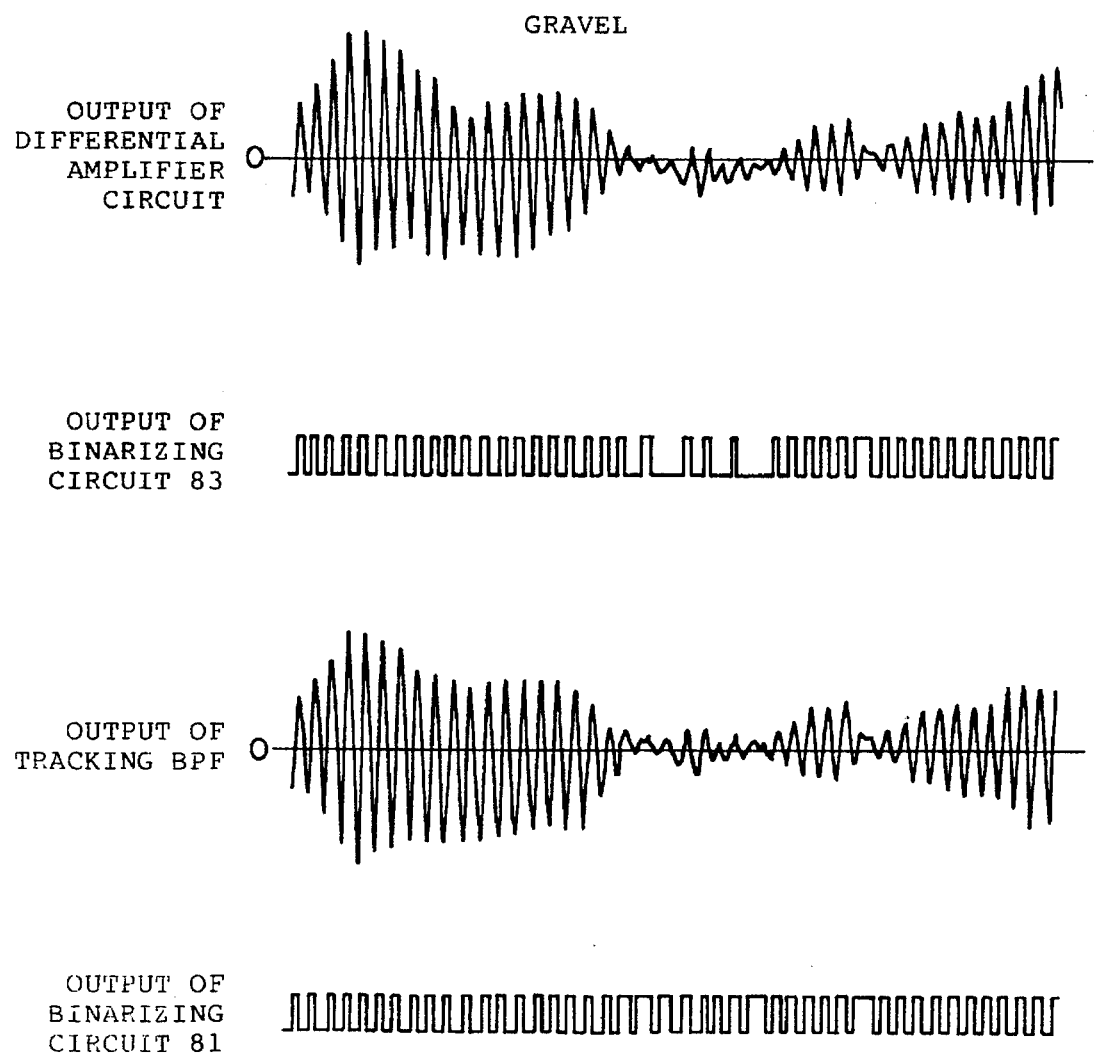
FIG. 33 is a waveform diagram showing a signal in case of a gravel road.

FIGS. 32 and 33 illustrate the waveforms of the output from the differential amplifier circuit 51, the output from the binarizing circuit 83, the output of the tracking BPF 52 and the output of the binarizing circuit 81, with FIG. 32 being for the case of a snowy road surface and FIG. 33 being for the case of a gravel road surface.

Since the output signal of the tracking BFP 52 is composed mainly of center-frequency components, the counter A counts a substantially constant value (speed is assumed to be constant) for a fixed period of time irrespective of the road surface condition.

By contrast, the output signal of the differential amplifier circuit 51 contains low-frequency components in addition to the center-frequency components. Since the amplitude of the low-frequency components is high in case of a snowy road, the center-frequency components assume a form in which they are superposed upon the low-frequency components. Accordingly, the number of pulses formed in a case where this signal is binarized is small and the value of the count in the counter B during the fixed period of time is small.

In a case where the road surface is gravel, the amplitude of the low-frequency components is small. Hence, the number of pulses formed in a case where the output signal of the differential amplifier circuit 51 is binarized at the zero level approaches the number of pulses obtained in a case where the center-frequency components are binarized. The value of the count in the counter B during the fixed period of time becomes a value near the value of the count in the counter A.

Accordingly, by comparing (as by taking the ratio of) the values of the counts in counter A and counter B in the fixed period of time, the road surface condition can be discriminated to be snow or gravel.

A timing circuit 86 resets the counters A, B and causes them to start counting the input pulses at fixed times. A discriminating circuit 85 reads the values of the counts in the counters A, B immediately before the counters A, B are reset and judges the road surface condition based upon the ratio between the counts.

In accordance with this approach, it is possible to distinguish between snow and asphalt, between asphalt and gravel, and among snow, asphalt and gravel.

It goes without saying that by taking into consideration the amount of regular reflected light, the amount of diffuse reflected light and the road surface temperature, as described above, it is possible to discriminate wetness, freezing and snow, etc., as well.

Figure 34:
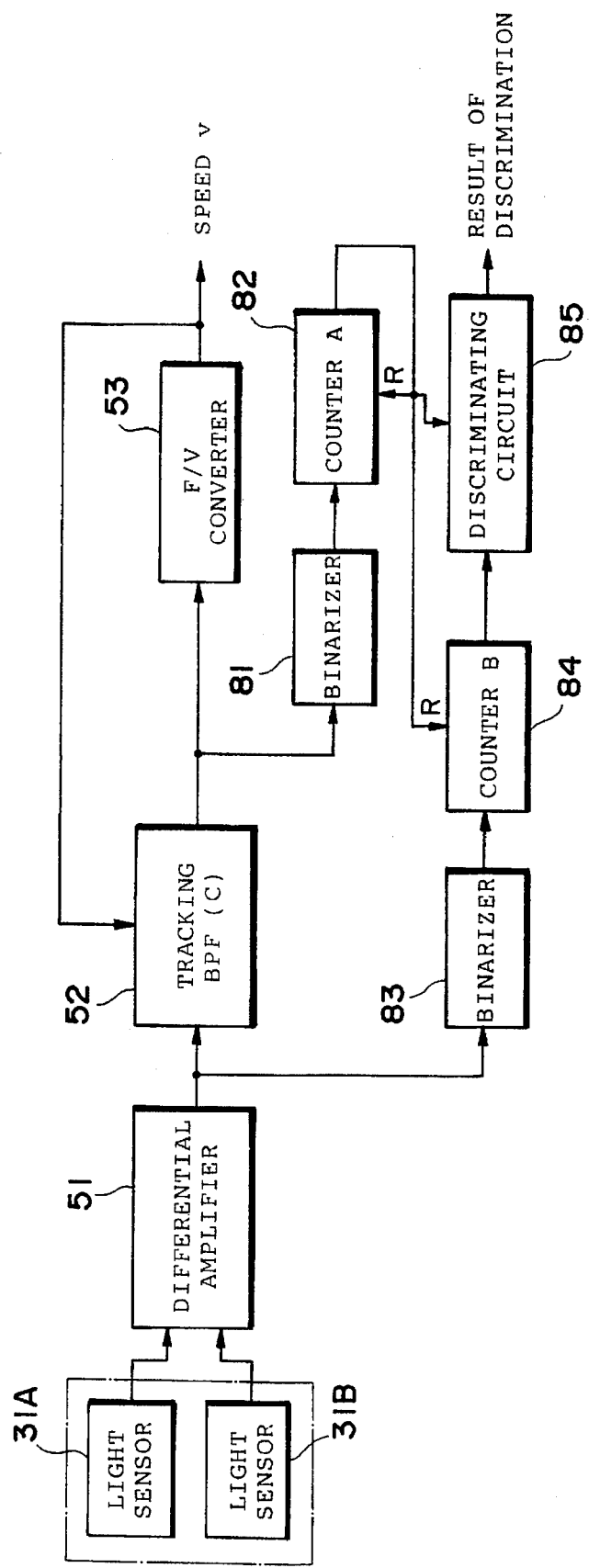
FIG. 34 is a block diagram illustrating the electrical configuration (a ninth aspect thereof) of the road surface discriminator.

FIG. 34 illustrates yet another example (a ninth aspect) of the signal processing circuit. In the example depicted in FIG. 31, the road surface is discriminated by utilizing the ratio between the values of the counts in the two counters A, B over a fixed period of time. In the circuit illustrated in FIG. 34, a discrimination output is obtained whenever the vehicle travels a fixed distance.

More specifically, the value of the count in the counter B at the moment the value of the count in the counter A reaches a predetermined prescribed value is read into the discriminating circuit 85. The latter discriminates the road surface condition based upon the value of the count in the counter B. The calculation of the ratio between the values of the counts in counters A, B by the discriminating circuit 85 can be eliminated.

When the value of the count in counter A attains the predetermined prescribed value, the counters A, B are reset and then start counting again.

By way of example, assume that the center spatial frequency of the road surface selected by the spatial filter is 0.25 (mm$^{-1}$) [the period is 4 (mm)]. Let the prescribed value set in the counter A be 250. In this case, road surface discrimination is performed a single time whenever the vehicle travels 4 (mm)×250=1 (m).

In the processing circuit shown in FIG. 31, the road surface condition is judged based upon the values of the counts in the counters A, B in the fixed period of time. Therefore, when the traveling speed of the vehicle is low, the values of the counts in the counters A, B are small and there are occasions where the discrimination accuracy is unsatisfactory. With the processing circuit shown in FIG. 34, the road surface is discriminated at the fixed traveling distances of the vehicle. As a result, response time is lengthened when the vehicle traveling speed is low.

Figure 35:
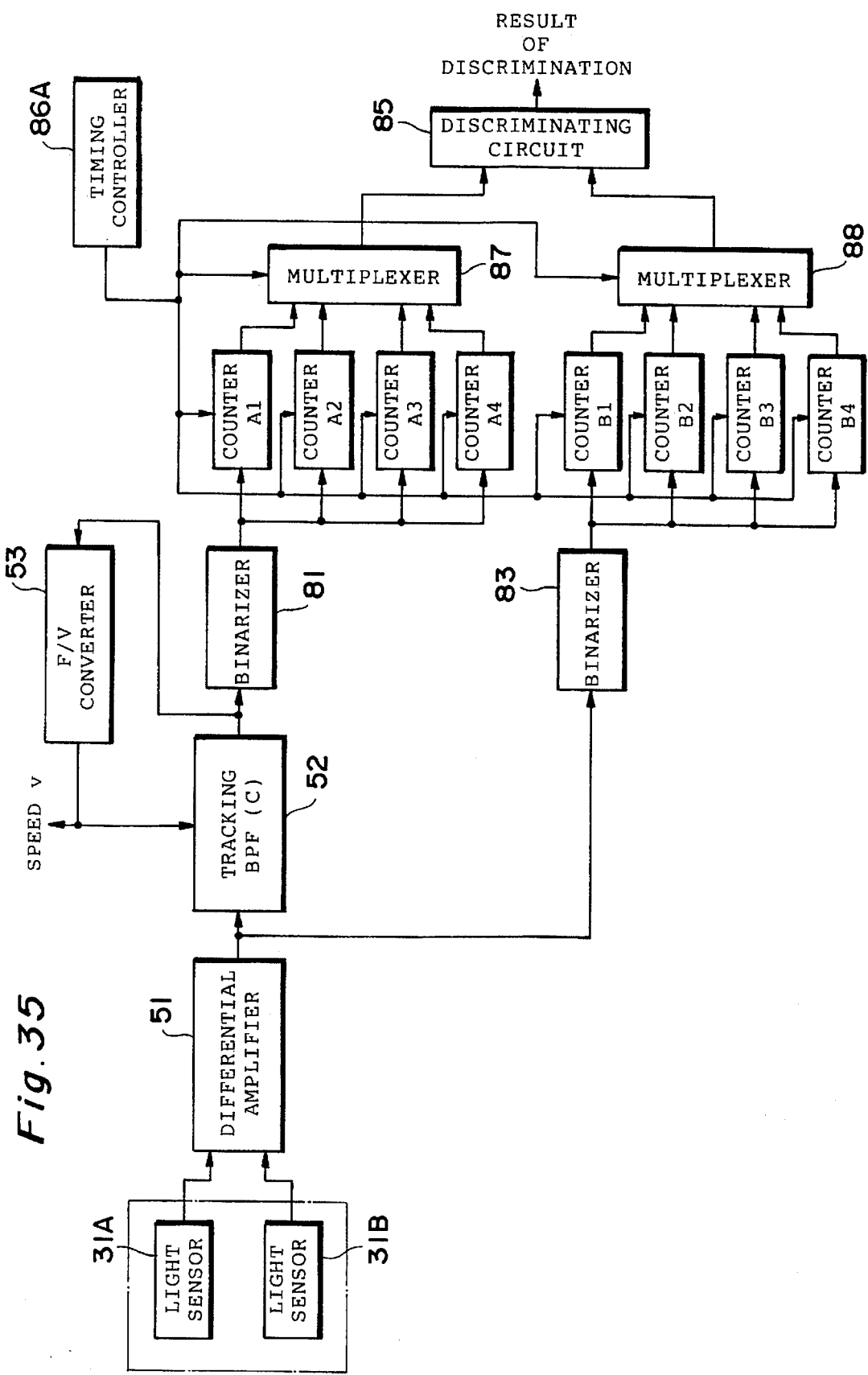
FIG. 35 is a block diagram illustrating the electrical configuration (a tenth aspect thereof) of the road surface discriminator.
Figure 36:
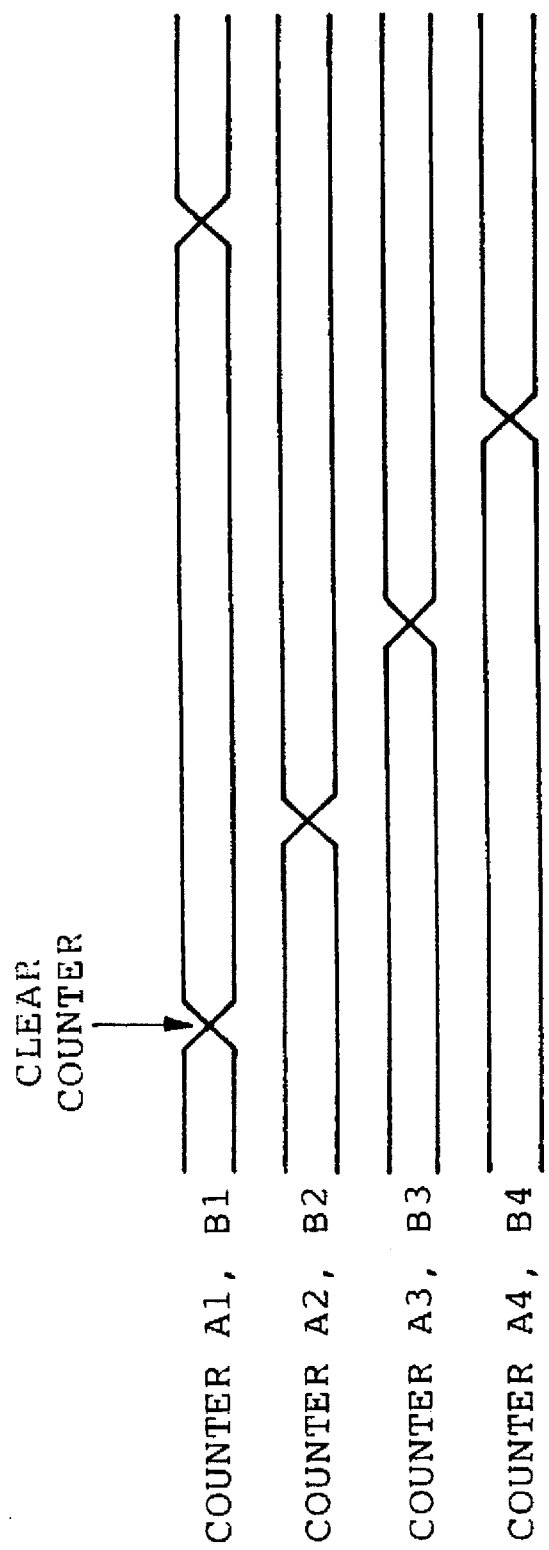
FIG. 36 is a time chart showing the operation of a counter.

A signal processing circuit (tenth aspect thereof) shown in FIG. 35 is an improvement over the processing circuit of FIG. 31 and is provided with four sets of counters A and B (counters A1 and B1; A2 and B2; A3 and B3; and A4 and B4). As shown in FIG. 36, the counters A, B of each set are reset/started at short time intervals under the control of the timing control circuit 86A. For example, if the counting time of the counters A, B of each set is 0.8 sec, the counting operation of the counters A, B in each set is started every 0.2 sec. Multiplexers 87, 88 change over the set of counters every 0.2 sec and apply the values of the counts to the discriminating circuit 85. As a result, the road surface discrimination period is 0.2 sec. Even if the road surface discrimination period is short, the counting time of the counters in each set is long (0.8 sec) and, hence, there is no decline in discrimination accuracy.

Figure 37:
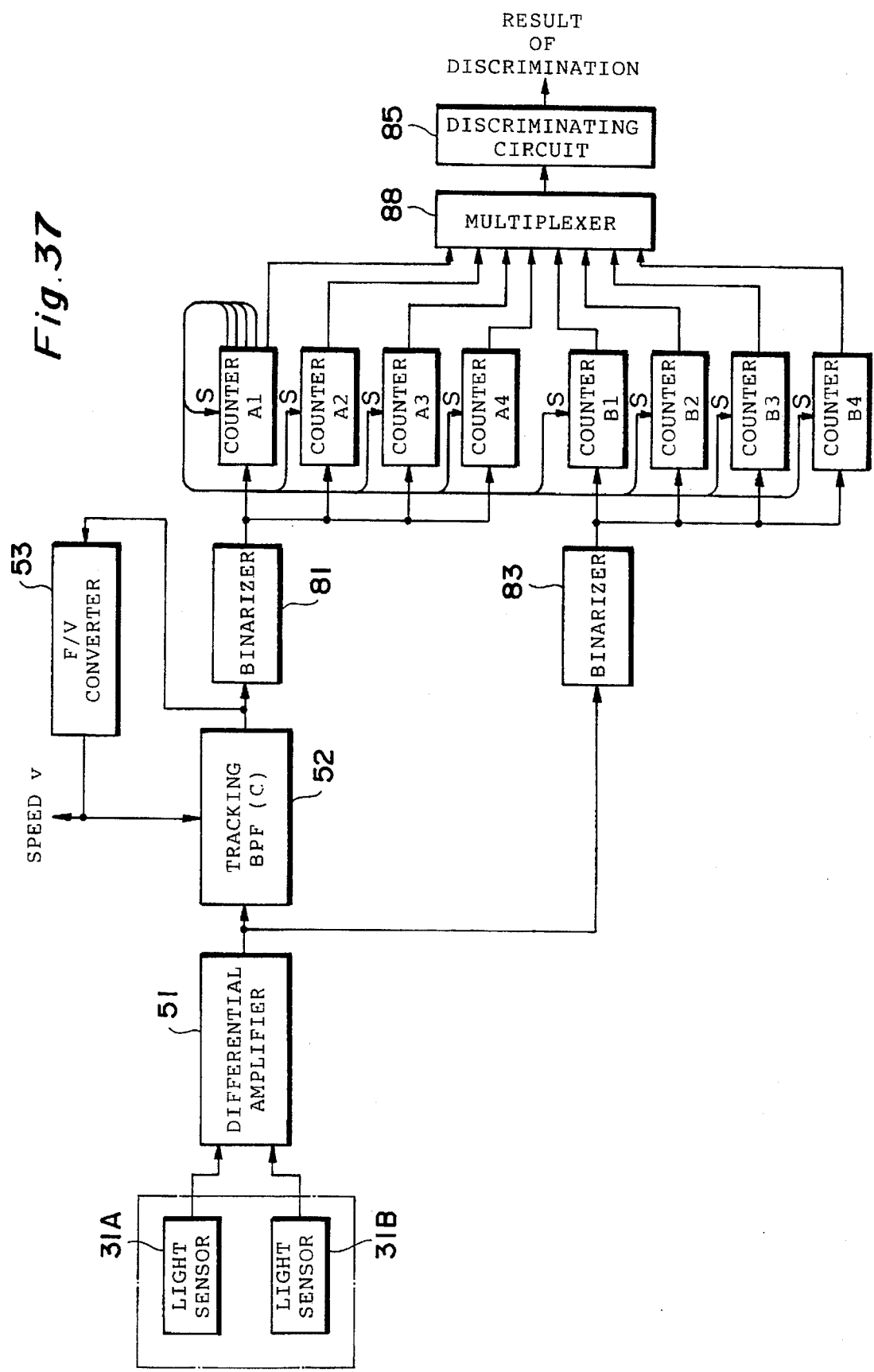
FIG. 37 is a block diagram illustrating the electrical configuration (an 11th aspect thereof) of the road surface discriminator.

A signal processing circuit (11th aspect thereof) shown in FIG. 37 is an improvement over the processing circuit shown in FIG. 34.

The counting operation of each set of counters A and B starts in dependence upon the value of the count in counter A1. For example, let 256 be the value of the count in set in counters A. When the value of the count in counter A1 is zero, the counters A1 and B1 start counting. When the values of counts registered by counter A1 are 64, 128 and 192, counters A2 and B2, counters A3 and B3 and counters A4 and B4, respectively, start counting.

When the value of the count in counter A1 reaches 256, the value of the count in counter B1 is applied to the discriminating circuit 85 via the multiplexer 88. Similarly, when the values of the counts in counters A2, A3 and A4 each reach 256, the values of the counts in the counters B2, B3 and B4 enter the discriminating circuit 85 via the multiplexer 88.

Even if the set counts in counters A are the same, the period of road surface discrimination takes on a value of one divided by the number of counter sets and response time is thus shortened over that of the circuitry shown in FIG. 34.

Figure 38:
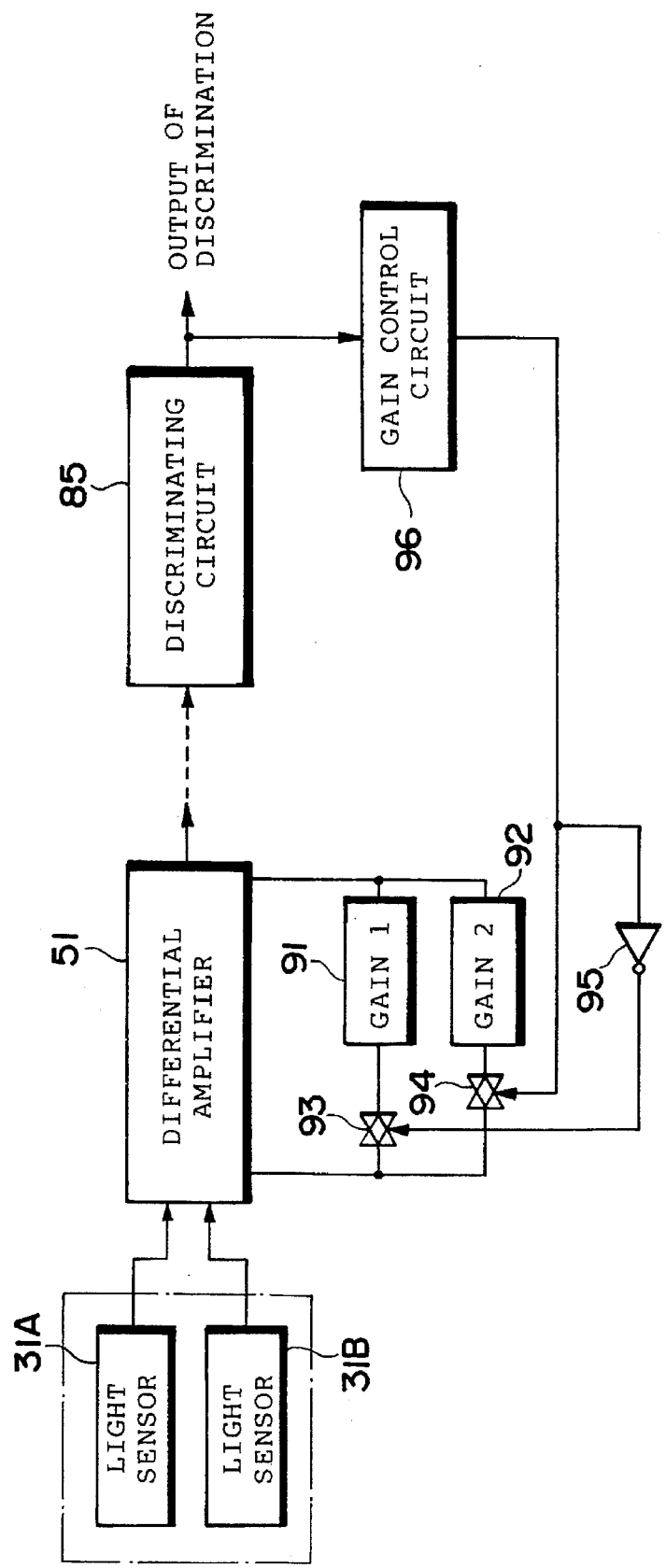
FIG. 38 is a block diagram illustrating the electrical configuration (an 12th aspect thereof) of the road surface discriminator.

FIG. 38 illustrates an example (12th aspect) in which the amplification factor of the differential amplifier circuit contained in the signal processing circuit and of other amplifier circuits is controlled in conformity with the results of road surface discrimination.

In case of a snowy road surface, for example, the light-receiving circuitry may saturate because the amount of diffuse reflected light is large. In order to prevent this situation from occurring, the gain of the amplifier circuitry is lowered when snow is discriminated.

A circuit (e.g., a feedback resistor) 91 which decides an effective amplification factor at the time of a road surface condition other than snow and a circuit 92 which provides a lower amplification factor used in case of snow are connected to the differential amplifier circuit 51 via analog switches 93 and 94, respectively. Control is performed by a gain control circuit 96 in dependence upon the results of road surface discrimination by the discriminating circuit 85 in such a manner that the analog switch 94 is turned on at the time of snow and the analog switch 93 is turned on at all other times. An inverter is indicated at 95. Saturation of the light-receiving circuitry can thus be prevented.

When gain control is performed based upon the reflectivity of the road surface, gain declines in case of a painted road surface (the reflectivity of which is high). Though the reflectivity of a painted road surface is high, the amplitude of the output from the light sensor of a spatial filter does not become very large. With the circuit of FIG. 38, gain will not be lowered erroneously even in case of such a road surface.

In the case of a snowy road, the amount of projected light from the light source 11, etc., may be reduced instead of lowering the gain of the amplifier circuitry.

(15) Example of applications of road surface discriminator

Figure 39:
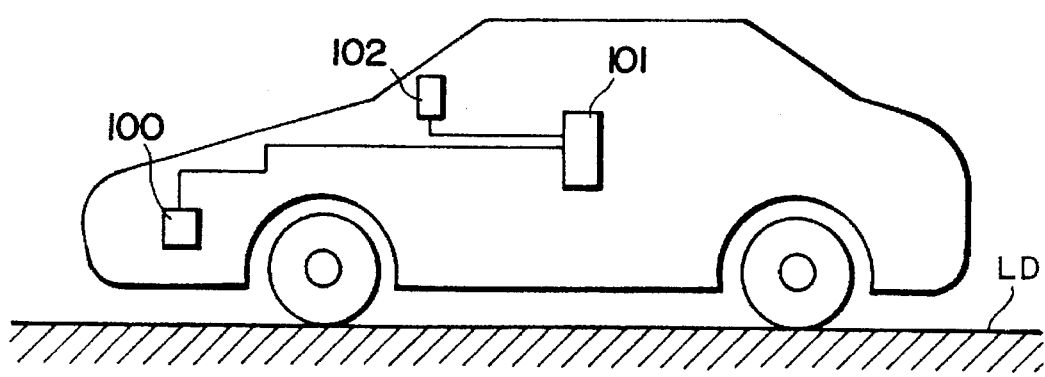
FIG. 39 illustrates an apparatus which issues a warning in dependence upon the results of road surface discrimination.

FIG. 39 illustrates an example of an apparatus for providing a driver with a necessary warning in dependence upon the results of road surface discrimination.

An automobile is equipped with a warning apparatus 102 which warns the driver of the fact that the possibility of slipping is high when sand or gravel, snow or freezing is detected by a road surface discriminator 100 having the above-described construction mounted on the vehicle. The result of road surface discrimination by the road surface discriminator 100 is applied to an ECU (electronic control unit) 101 for an ABS (antilock brake system). When the ECU 101 has judged that the possibility of slipping is high (the above-mentioned snow or freezing condition), the ECU 101 outputs a signal to the warning apparatus 102 to so notify the driver of this fact. This warning is realized by an audio output, a display on a screen or lighting of an indicator lamp.

Figure 40:
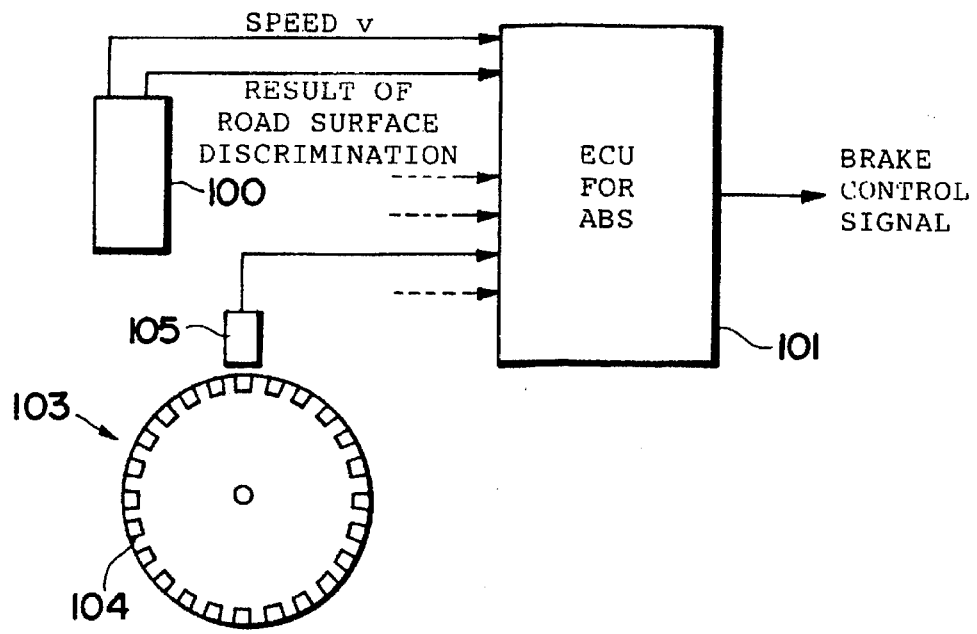
FIG. 40 illustrates an antilock brake system (ABS)

FIG. 40 illustrates the construction of an ABS equipped with a road surface discriminator for outputting speed and the result of road surface discrimination.

The outputs (ground speed v and result of road surface discrimination) of the road surface discriminator 100 and the output (wheel speed $v_w$) of a wheel rotational-speed sensor 103 are applied to the ECU 101.

The wheel rotational-speed sensor 103 comprises a rotor 104 attached to a tire of the vehicle and having a number of magnetic-pole teeth on the circumference thereof, and an electromagnetic pick-up-type sensor 105 for outputting a pulsed signal whose frequency is proportional to the rotational speed of the rotor 104. The frequency of the output pulses from the sensor 105 represents the wheel speed $v_w$.

The ECU 101 calculates slip factor λ in accordance with the following equation based upon the input ground speed v and wheel speed $v_w$:

$$\lambda = (v - v_w)/v \quad \text{Eq. (7)}$$

The ECU 101 further includes a table of the kind shown in FIG. 41 storing optimum slip factors $\lambda_m$ that conform to the road surface conditions. This table is created by preliminary testing.

The ECU 101 reads the optimum slip factor $\lambda_m$ conforming to the result of road surface discrimination out of the table and outputs a brake-pressure control signal so as to make the calculated slip factor λ and the optimum slip factor $\lambda_m$ coincide. This brake control preferably is carried out feedback control.

Figure 42:
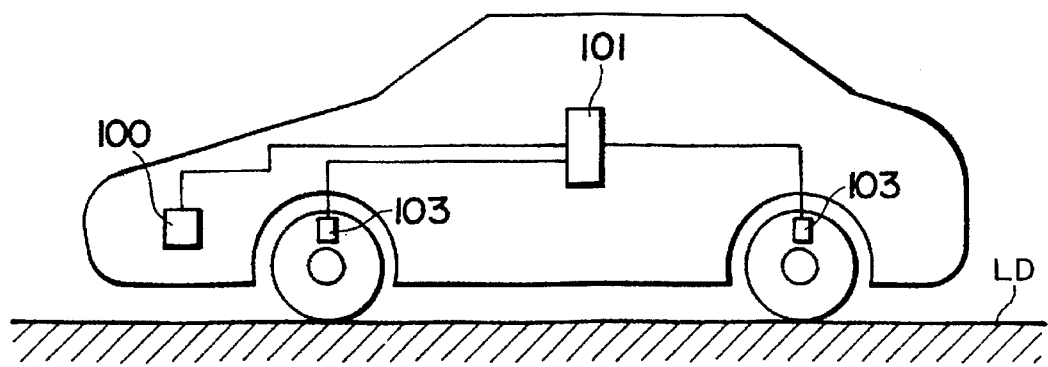
FIG. 42 illustrates a vehicle in which an ABS has been installed.

FIG. 42 illustrates an automobile equipped with the above-mentioned ABS. The ABS is constructed to minimize traveling distance on all road surfaces, without the tires locking up, by executing the above-described processing based upon an output signal from the road surface discriminator 100, which has a ground-speed sensing function, and an output signal from the wheel rotational-speed sensor 103.

Further, a traction control system (TCL) for controlling acceleration can be constructed in such a manner that tires will not slip at the moment of forward propulsion, this being accomplished by storing the result of road surface discrimination immediately before the vehicle is stopped. In TCL, a table in which an optimum engine rpm for each type of road surface has been stored is created in advance. In accordance with the result of road discrimination stored just prior to stopping of the vehicle, the ECU 101 refers to the table and acceleration is controlled in such a manner that the optimum engine rpm commensurate with the road surface condition will be attained.

Whether or not forward propulsion of the vehicle has been performed normally is judged by the ECU 101 based upon ground speed. If the vehicle is slipping, the ECU 101 performs control so as to lower engine rpm.

Figure 43:
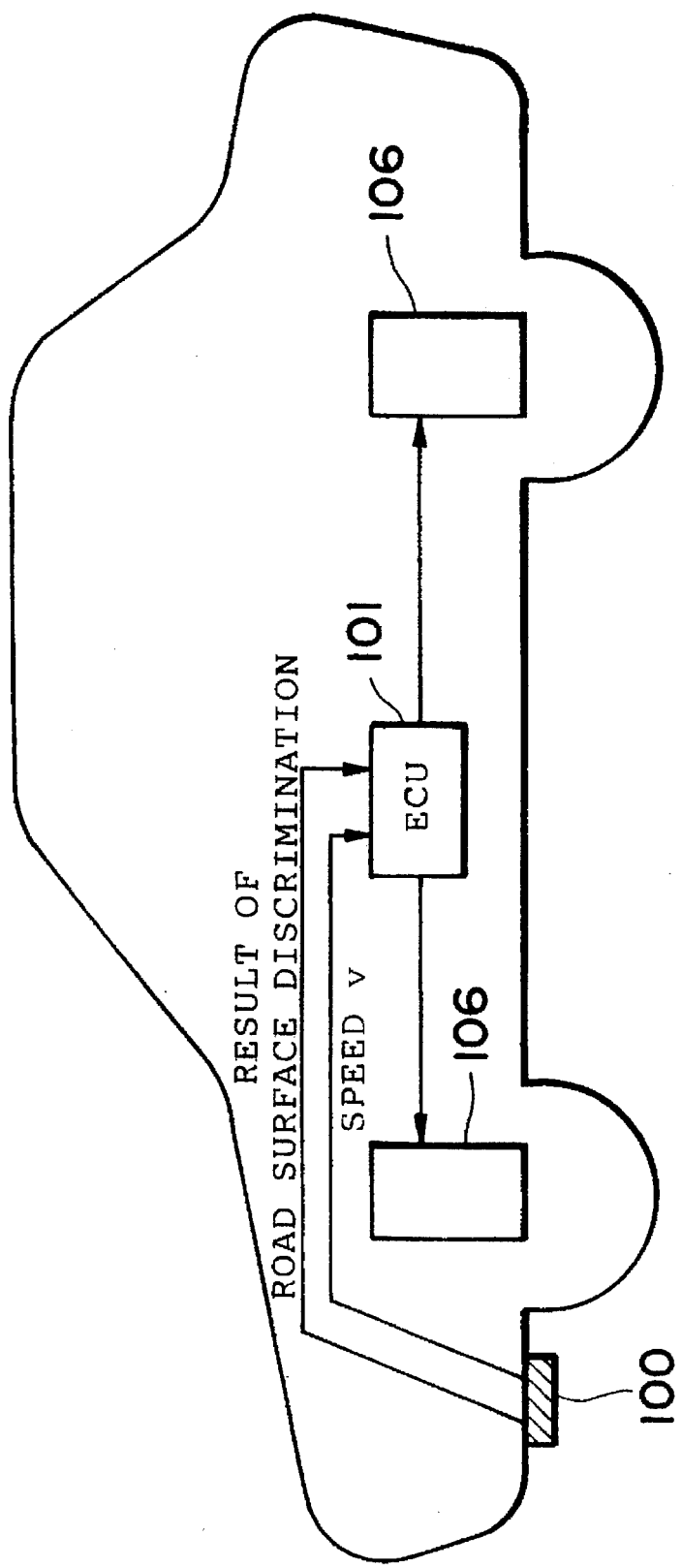
FIG. 43 illustrates a vehicle in which a suspension control apparatus has been installed.
Figure 44:
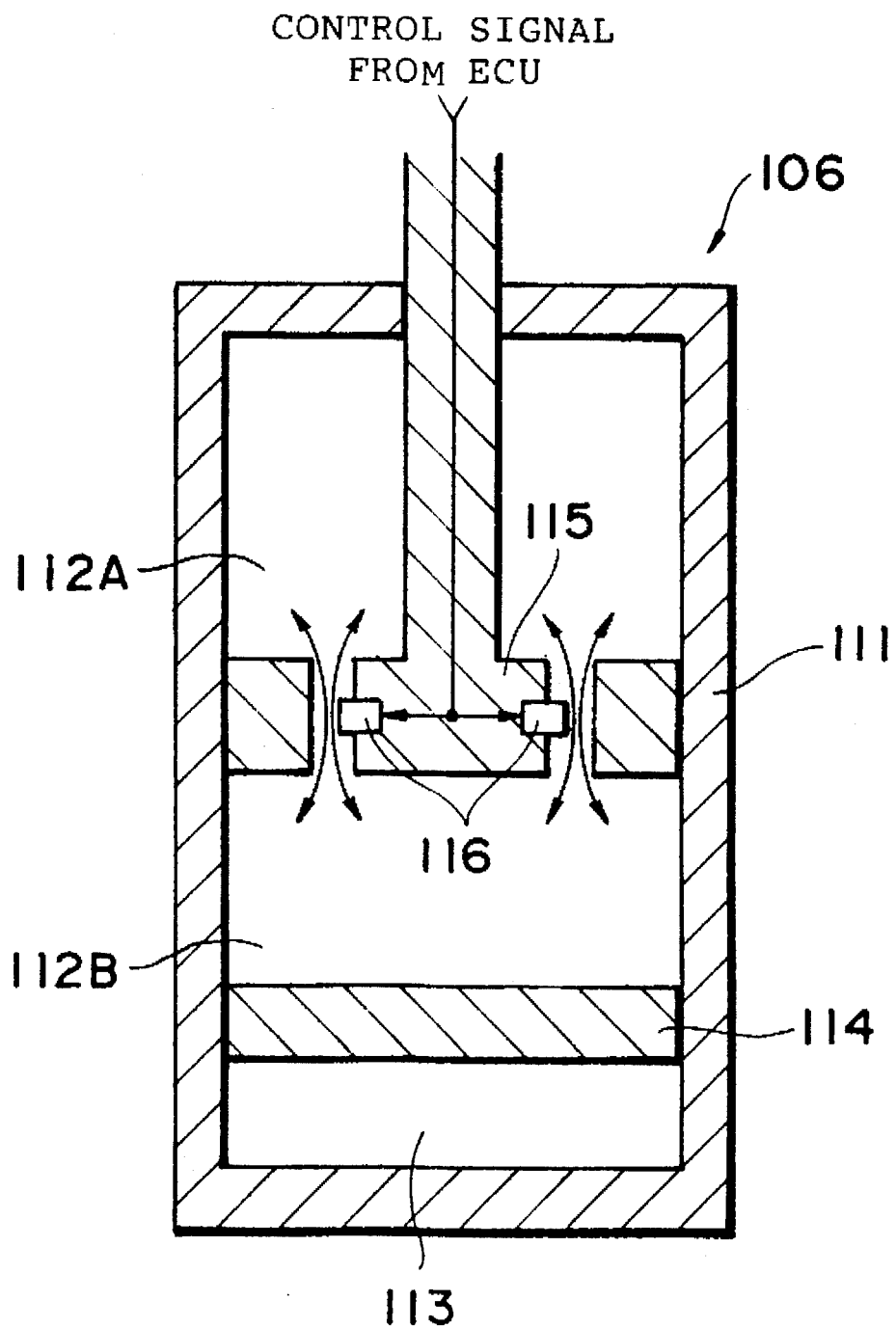
FIG. 44 is a sectional view of a shock absorber.

FIG. 43 illustrates a suspension control apparatus having the road surface discriminator, and FIG. 44 is a sectional view of a shock absorber, which is the principal component used in suspension control.

The road surface discriminator 100 provides the ECU 101 with the result of road surface discrimination and the ground speed v. The ECU 101 provides a shock absorber 106 with a control signal.

In order to assure vehicle maneuverability, safety and riding comfort regardless of road surface conditions, it is required that so-called "tightness" of the suspension be controlled in conformity with the road surface condition. For example, suspension is relaxed in case of a gravel or sandy road the surface of which highly uneven and is tightened in case of an asphalt or concrete road.

A function of this kind is implemented by controlling, in the manner described below, the degree of opening of electromagnetic valves within the shock absorber in dependence upon the result of road surface discrimination.

As shown in FIG. 44, a piston 115 secured to the chassis of an automobile moves up and down within a cylinder 111, which is secured to the frame of the automobile, as the chassis oscillates. When the piston 115 moves, a fluid (oil) filling hydraulic chambers 112A, 112B moves between the hydraulic chambers 112A, 112B through passageways of electromagnetic valves 116. The electromagnetic valves 116 are driven and controlled by a control signal from the ECU 101. As a result, the area of the fluid passageway in each electromagnetic valve 116 changes. This makes it possible to control the vibration attenuating force.

When the road surface discriminator 100 has discriminated a gravel or sandy road surface, the electromagnetic valves 116 are opened widely to relax the suspension. When the road surface has been discriminated as being asphalt or concrete, the electromagnetic valves 116 are opened narrowly to tighten the suspension.

A free piston 114 and an air chamber 113 are for the purpose of absorbing a difference in the change of volume in the hydraulic chambers 112A, 112B. Control for opening and closing the electromagnetic valves 116 may use the speed v and not only the result of road surface discrimination. For example, at high traveling speed the shock received is large even when a road surface is only slightly irregular. As such time, therefore, control should be performed so as to relax the suspension.

What is claimed is:

1. A road surface discriminator comprising:
   a first light source for projecting light toward a road surface;
   a first spatial filter light-receiving optical system having first spatial filter means and first light-receiving means, wherein reflected light from the road surface on which light is projected from said first light source is received by the first light-receiving means through said first spatial filter means and the first-light receiving means outputs an electric signal representing the reflected light received;
   a second light-receiving optical system having second light-receiving means, wherein reflected light from the road surface on which light is projected from said first light source is received by said second light-receiving means and said second-light receiving means outputs an electric signal representing the reflected light received;
   a first signal processing circuit for detecting intensity of a center-frequency component, which corresponds to the spatial frequency of said first spatial filter means, based upon the electric signal outputted by said first spatial filter light-receiving optical system;
   a second signal processing circuit for detecting intensity of a low-frequency component, which corresponds to a spatial frequency lower than the spatial frequency of said first spatial filter means, based upon the electric signal outputted by said second light-receiving optical system; and discriminating means for discriminating condition of the road surface based upon the intensity of the center-frequency component detected by said first signal processing circuit and the intensity of the low-frequency component detected by the second signal processing circuit.

2. A road surface discriminator according to claim 1, wherein said second light-receiving optical system is contained in said first spatial filter light-receiving optical system and said second light-receiving means is said first light-receiving means;

the electric signal outputted by said first light-receiving means being applied to said first signal processing circuit and said second signal processing circuit.

3. A road surface discriminator according to claim 1, wherein part of said second light-receiving optical system is contained in said first spatial filter light-receiving optical system, and said second light-receiving means receives reflected light that does not pass through said first spatial filter means.

4. A road surface discriminator according to claim 1, wherein said second light-receiving optical system has a second spatial filter having a spatial frequency lower than the spatial frequency of said first spatial filter means, and said second light-receiving means receives reflected light through said second spatial filter.

5. A road surface discriminator according to claim 1, wherein a road surface condition discriminated by said discriminating means is at least one of snow, gravel and asphalt.

6. A road surface discriminator according to claim 1, wherein said first light source, said first spatial filter light-receiving optical system and said second light-receiving optical system are arranged in such a manner that said first and second light-receiving means receive diffuse reflected light from the road surface.

7. A road surface discriminator according to claim 1, further comprising a second light source for projecting light toward the road surface and a third light-receiving optical system, which includes a third light-receiving element, the second light source and the third light-receiving optical system being arranged in such a manner that said third light-receiving element receives regular reflected light from the road surface on which light is projected from said second light source;

said discriminating means discriminating condition of wetness of the road surface based upon an output signal from said third light-receiving element.

8. A road surface discriminator according to claim 7, further comprising a light-quantity detector for detecting the quantity of light in the projected light from said second light source;

said discriminating means discriminating the condition of wetness of the road surface based upon a value obtained by normalizing the output signal of said third light-receiving element by the quantity of light detected by said light-quantity detector.

9. A road surface discriminator according to claim 7, wherein said third light-receiving optical system is contained in said first spatial filter light-receiving optical system and said third light-receiving element is said first light-receiving element.

10. A road surface discriminator according to claim 9, further comprising:

separating means for separating an output signal of said first light-receiving element into a first signal component, which results from the projected light of said first light source, and a second signal component, which results from the projected light of said second light source;

said first signal processing circuit detecting intensity of the center-frequency component of diffused light based upon said first signal component separated by said separating means; and a third signal processing circuit for detecting intensity of the center-frequency component of regular reflected light based upon said second signal component separated by said separating means;

said discriminating means discriminating the condition of wetness of the road surface based upon a ratio of said intensity of the center-frequency component of regular reflected light to said intensity of the center-frequency component of diffused light.

11. A road surface discriminator according to claim 10, further comprising:

a drive circuit for driving said first light source and said second light source based upon respective signals of different phase or different frequency; and said separating means being a demodulating circuit for demodulating respective signals that have been modulated by signals of different phase or signals of different frequency.

12. A road surface discriminator according to claim 7, further comprising a temperature sensor for measuring road surface temperature or air temperature;

said discriminating means determining freezing if, when wetness has been discriminated, the temperature sensed by said temperature sensor is less than a predetermined value.

13. A road surface discriminator according to claim 7, further comprising:

a drive circuit for driving said first and second light sources based upon respective signals of different phase or different frequency; and a demodulating circuit for demodulating output signals from said first and second light-receiving means and an output signal from third light-receiving means.

14. A road surface discriminator according to claim 7, further comprising control means for varying the quantity of projected light from said first or second light source in dependence upon result of discrimination performed by said discriminating means.

15. A road surface discriminator according to claim 1, further comprising a fourth signal processing circuit for detecting a diffused light component of very low frequency based upon the output signal of said first light-receiving element or said second light-receiving element;

said discriminating means judging snow in a case where the diffused light component detected by the fourth signal processing means exceeds a predetermined value.

16. A road surface discriminator according to claim 1, wherein said first light source has:

a plurality of light-emitting elements; and a plurality of lenses corresponding to said light-emitting elements and disposed in front of them;

optic axes of said light-emitting elements and optic axes of the lenses corresponding thereto being offset from each other.

17. A road surface discriminator according to claim 1, wherein said first signal processing circuit includes a tracking band-pass filter, said tracking band-pass filter outputting a signal representing ground speed and the pass band thereof being controlled based upon the speed signal.

18. A road surface discriminator according to claim 17, wherein said second signal processing circuit includes a tracking low-pass filter in which cut-off frequency is controlled based upon said speed signal.

19. A road surface discriminator according to claim 1, further comprising:
   a drive circuit for driving said first light source based upon a signal which varies with time; and
   a demodulating circuit for demodulating output signals from said first and second light-receiving means.

20. A road surface discriminator according to claim 1, further comprising:
   an amplifier circuit for amplifying electric signals inclusive of a light-reception signal; and
   means for controlling amplification factor of said amplifier circuit in dependence upon result of discrimination performed by said discriminating means.

21. A road surface discriminator according to claim 1, further comprising a display device for displaying result of discrimination performed by said discriminating means.

22. A road surface discriminator according to claim 1, further comprising a speed detecting circuit for outputting a signal representing ground speed based upon said center-frequency component.

23. A vehicle in which the road surface discriminator set forth in claim 22 has been installed.

24. A vehicle according to claim 23, further comprising:
   a wheel speed sensor for sensing wheel speed; and
   brake control means for controlling a brake based upon result of road surface discrimination and ground speed provided by said road surface discriminator and wheel speed provided by said wheel speed sensor.

25. A vehicle according to claim 23, further comprising:
   a shock absorber provided on a vehicle body; and
   suspension control means for controlling said shock absorber in dependence upon result of road surface discrimination and ground speed from said road surface discriminator.

26. A road surface discriminator comprising:
   a source for projecting light toward a road surface;
   a spatial filter light-receiving optical system for receiving diffuse reflected light from the road surface, on which light is projected from said light source, through a spatial filter and outputting an electric signal representing the reflected light received;
   a first signal processing circuit for detecting intensity of a center-frequency component, which corresponds to the spatial frequency of the spatial filter, based upon the electric signal outputted by said spatial filter light-receiving optical system;
   a second signal processing circuit for detecting intensity of a low-frequency component, which corresponds to a spatial frequency lower than the spatial frequency of said spatial filter means, based upon the electric signal outputted by said spatial filter light-receiving optical system; and
   discriminating means for discriminating condition of the road surface based upon the intensity of the center-frequency component detected by said first signal processing circuit and the intensity of the low-frequency component detected by the second signal processing circuit.

27. A road surface discriminator according to claim 26, wherein a road surface condition discriminated by said discriminating means is at least one of snow, gravel and asphalt.

28. A road surface discriminator according to claim 26, further comprising a second light source for projecting light toward the road surface and a second light-receiving optical system, which includes a second light-receiving element, the second light source and the second light-receiving optical system being arranged in such a manner that said second light-receiving element receives regular reflected light from the road surface on which light is projected from said second light source;
   said discriminating means discriminating condition of wetness of the road surface based upon an output signal from said second light-receiving element.

29. A road surface discriminator according to claim 28, further comprising a temperature sensor for measuring road surface temperature or air temperature;
   said discriminating means determining freezing if, when wetness has been discriminated, the temperature sensed by said temperature sensor is less than a predetermined value.

30. A road surface discriminator comprising:
   a light source for projecting light toward a road surface;
   a spatial filter light-receiving optical system for receiving diffuse reflected light from the road surface, on which light is projected from said light source, through a spatial filter and outputting an electric signal representing the reflected light received;
   a signal processing circuit for detecting a center-frequency component, which corresponds to the spatial frequency of said spatial filter, based upon the electric signal outputted by said spatial filter light-receiving optical system;
   first counting means for counting zero cross points of the center-frequency component outputted by said signal processing circuit;
   second counting means for counting zero cross points of the electric signal outputted by said spatial filter light-receiving optical system; and
   discriminating means for discriminating condition of the road surface based upon a count value in said first counting means and a count value in said second counting means.

31. A road surface discriminator according to claim 30, wherein a road surface condition discriminated by said discriminating means is at least one of snow, gravel and asphalt.

32. A road surface discriminator according to claim 30, wherein said discriminating means performs discrimination and said first and second counting means start counting at prescribed times.

33. A road surface discriminator according to claim 30, wherein said discriminating means performs discrimination and said first and second counting means start counting whenever a count in said first counter reaches a prescribed number.

34. A road surface discriminator according to claims 30, wherein said first and second counting means are provided in a plurality of pairs, and the moment at which counting by said first and second counting means starts is set so as to be different for each pair.

35. A road surface discriminator according to claims 30, further comprising a second light source for projecting light toward the road surface and a second light-receiving optical system, which includes a second light-receiving element, the second light source and the second light-receiving optical system being arranged in such a manner that said second light-receiving element receives regular reflected light from the road surface on which light is projected from said second light source;

said discriminating means discriminating condition of wetness of the road surface based upon an output signal from said second light-receiving element.

36. A road surface discriminator according to claim 35, further comprising a temperature sensor for measuring road surface temperature or air temperature;

said discriminating means determining freezing if, when wetness has been discriminated, the temperature sensed by said temperature sensor is less than a predetermined value.

37. An object discriminator comprising:

a first light source for projecting light toward a surface of the object;

a first spatial filter light-receiving optical system having first spatial filter means and first light-receiving means, wherein reflected light from the surface of the object on which light is projected from said first light source is received by the first light-receiving means through said first spatial filter means and the first-light receiving means outputs an electric signal representing the reflected light received;

a second light-receiving optical system having second light-receiving means, wherein reflected light from the surface of the object on which light is projected from said first light source is received by said second light-receiving means and said second-light receiving means outputs an electric signal representing the reflected light received;

a first signal processing circuit for detecting intensity of a center-frequency component, which corresponds to the spatial frequency of said first spatial filter means, based upon the electric signal outputted by said first spatial filter light-receiving optical system;

a second signal processing circuit for detecting intensity of a second frequency component, which corresponds to a spatial frequency lower or higher than the spatial frequency of said first spatial filter means, based upon the electric signal outputted by said second light-receiving optical system; and discriminating means for discriminating condition of the surface of the object based upon the intensity of the center-frequency component detected by said first signal processing circuit and intensity of the second frequency component detected by the second signal processing circuit.

38. An object discriminator comprising:

a first light source for projecting light toward a surface of the object;

a spatial filter light-receiving optical system for receiving diffuse reflected light from the surface of the object, on which light is projected from said light source, through a spatial filter and outputting an electric signal representing the reflected light received;

a first signal processing circuit for detecting intensity of a center-frequency component, which corresponds to the spatial frequency of the spatial filter, based upon the electric signal outputted by said spatial filter light-receiving optical system;

a second signal processing circuit for detecting intensity of a second frequency component, which corresponds to a spatial frequency lower or higher than the spatial frequency of said spatial filter, based upon the electric signal outputted by said spatial filter light-receiving optical system; and discriminating means for discriminating condition of the surface of the object based upon the intensity of the center-frequency component detected by said first signal processing circuit and intensity of the second frequency component detected by the second signal processing circuit.

39. An object discriminator comprising:

a light source for projecting light toward a surface of the object;

a spatial filter light-receiving optical system for receiving diffuse reflected light from the surface of the object, on which light is projected from said light source, through a spatial filter and outputting an electric signal representing the reflected light received;

a signal processing circuit for detecting a center-frequency component, which corresponds to the spatial frequency of said spatial filter, based upon the electric signal outputted by said spatial filter light-receiving optical system;

first counting means for counting zero cross points of the center-frequency component outputted by said signal processing circuit;

second counting means for counting zero cross points of the electric signal outputted by said spatial filter light-receiving optical system; and discriminating means for discriminating condition of the surface of the object based upon a count value in said first counting means and a count value in said second counting means.

40. A mobile body having a road surface discriminator, the road surface discriminator comprising:

a first light source for projecting light toward a road surface;

a first spatial filter light-receiving optical system having first spatial filter means and first light-receiving means, wherein reflected light from the road surface on which light is projected from said first light source is received by the first light-receiving means through said first spatial filter means and the first-light receiving means outputs an electric signal representing the reflected light received;

a second light-receiving optical system having second light-receiving means, wherein reflected light from the road surface on which light is projected from said first light source is received by said second light-receiving means and said second-light receiving means outputs an electric signal representing the reflected light received;

a first signal processing circuit for detecting intensity of a center-frequency component, which corresponds to the spatial frequency of said first spatial filter means, based upon the electric signal outputted by said first spatial filter light-receiving optical system;

a second signal processing circuit for detecting intensity of a low-frequency component, which corresponds to a spatial frequency lower than the spatial frequency of said first spatial filter means, based upon the electric signal outputted by said second light-receiving optical system; and discriminating means for discriminating condition of the road surface based upon the intensity of the center-frequency component detected by said first signal processing circuit and the intensity of the low-frequency component detected by the second signal processing circuit.

41. A vehicle having a road surface discriminator, the road surface discriminator comprising:

a first light source for projecting light toward a road surface;

a first spatial filter light-receiving optical system having first spatial filter means and first light-receiving means, wherein reflected light from the road surface on which light is projected from said first light source is received by the first light-receiving means through said first spatial filter means and the first-light receiving means outputs an electric signal representing the reflected light received;

a second light-receiving optical system having second light-receiving means, wherein reflected light from the road surface on which light is projected from said first light source is received by said second light-receiving means and said second-light receiving means outputs an electric signal representing the reflected light received;

a first signal processing circuit for detecting intensity of a center-frequency component, which corresponds to the spatial frequency of said first spatial filter means, based upon the electric signal outputted by said first spatial filter light-receiving optical system;

a second signal processing circuit for detecting intensity of a low-frequency component, which corresponds to a spatial frequency lower than the spatial frequency of said first spatial filter means, based upon the electric signal outputted by said second light-receiving optical system; and discriminating means for discriminating condition of the road surface based upon the intensity of the center-frequency component detected by said first signal processing circuit and the intensity of the low-frequency component detected by the second signal processing circuit.

42. A vehicle according to claim 41, further comprising:

judging means for judging that possibility of slipping is high based upon result of road surface discrimination performed by said road surface discriminator; and a warning device for issuing a warning indicative of result of judgment rendered by said judging means.

43. A vehicle according to claim 41, further comprising means for controlling an accelerator based upon result of road surface discrimination provided by said road surface discriminator.

44. A vehicle according to claim 41, comprising:

a shock absorber provided on a vehicle body; and suspension control means for controlling said shock absorber in dependence upon result of road surface discrimination performed by said road surface discriminator.

* * * * *